Aug. 29, 1961 J. C. GIBSON 2,998,493
OFFICE TRANSLATOR ARRANGEMENT FOR SWITCHING SYSTEMS
Filed Aug. 17, 1959 13 Sheets-Sheet 1
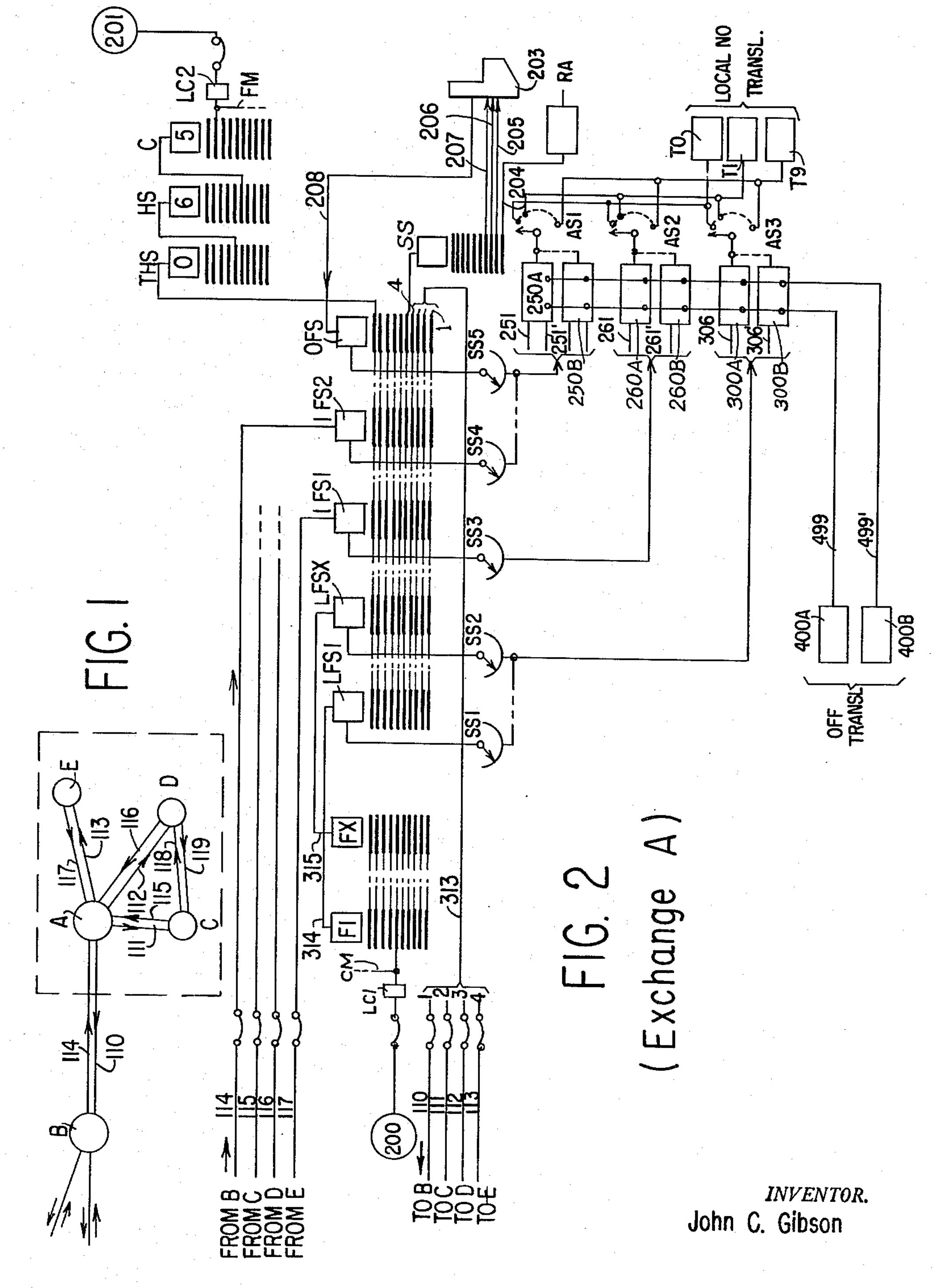
FIG. 1, FIG. 2 (Exchange A)
INVENTOR.
John C. Gibson

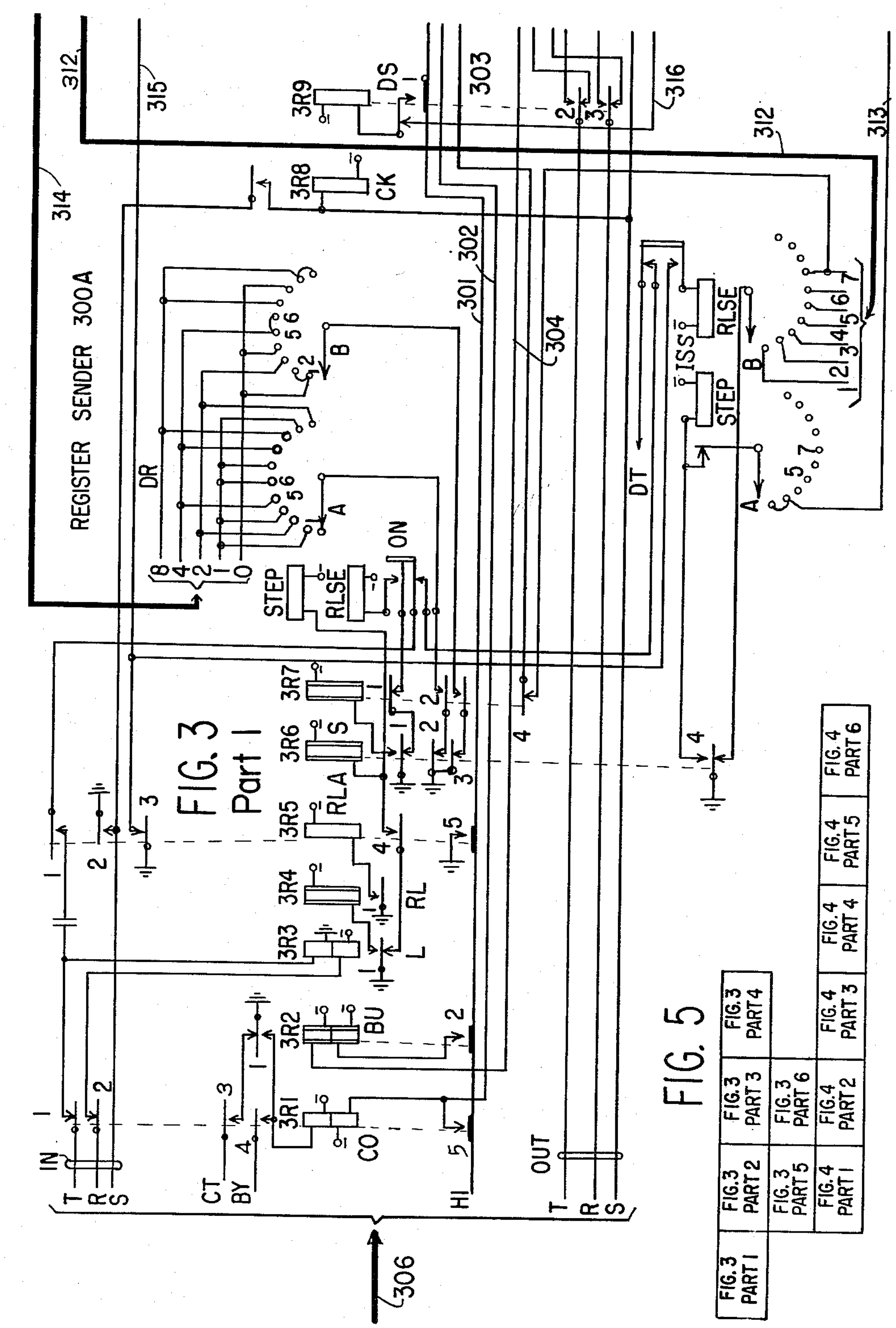
FIG. 3 Part 1, FIG. 5

Aug. 29, 1961 J. C. GIBSON 2,998,493
OFFICE TRANSLATOR ARRANGEMENT FOR SWITCHING SYSTEMS
Filed Aug. 17, 1959 13 Sheets-Sheet 3
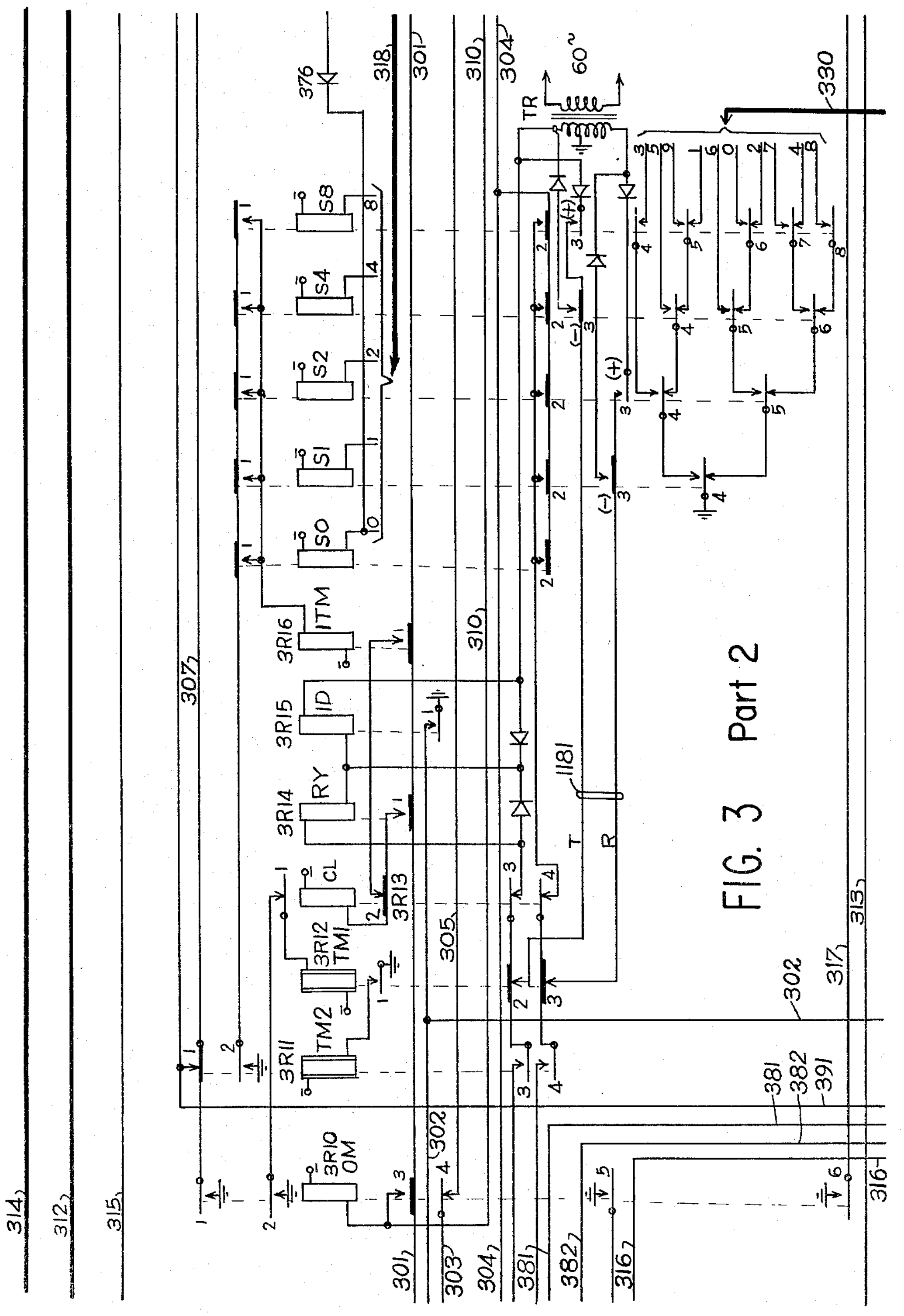
FIG. 3 Part 2

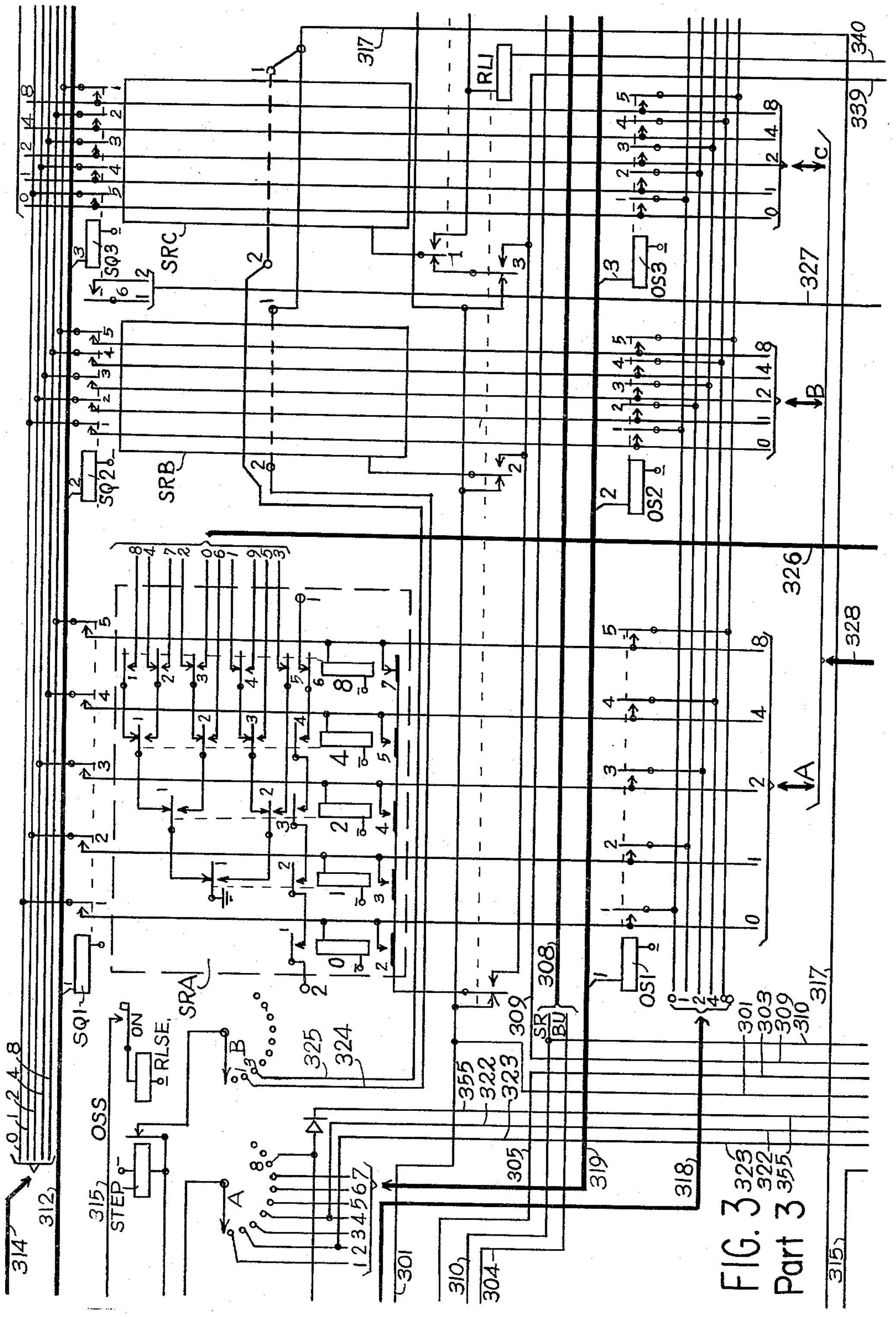
FIG. 3 Part 3

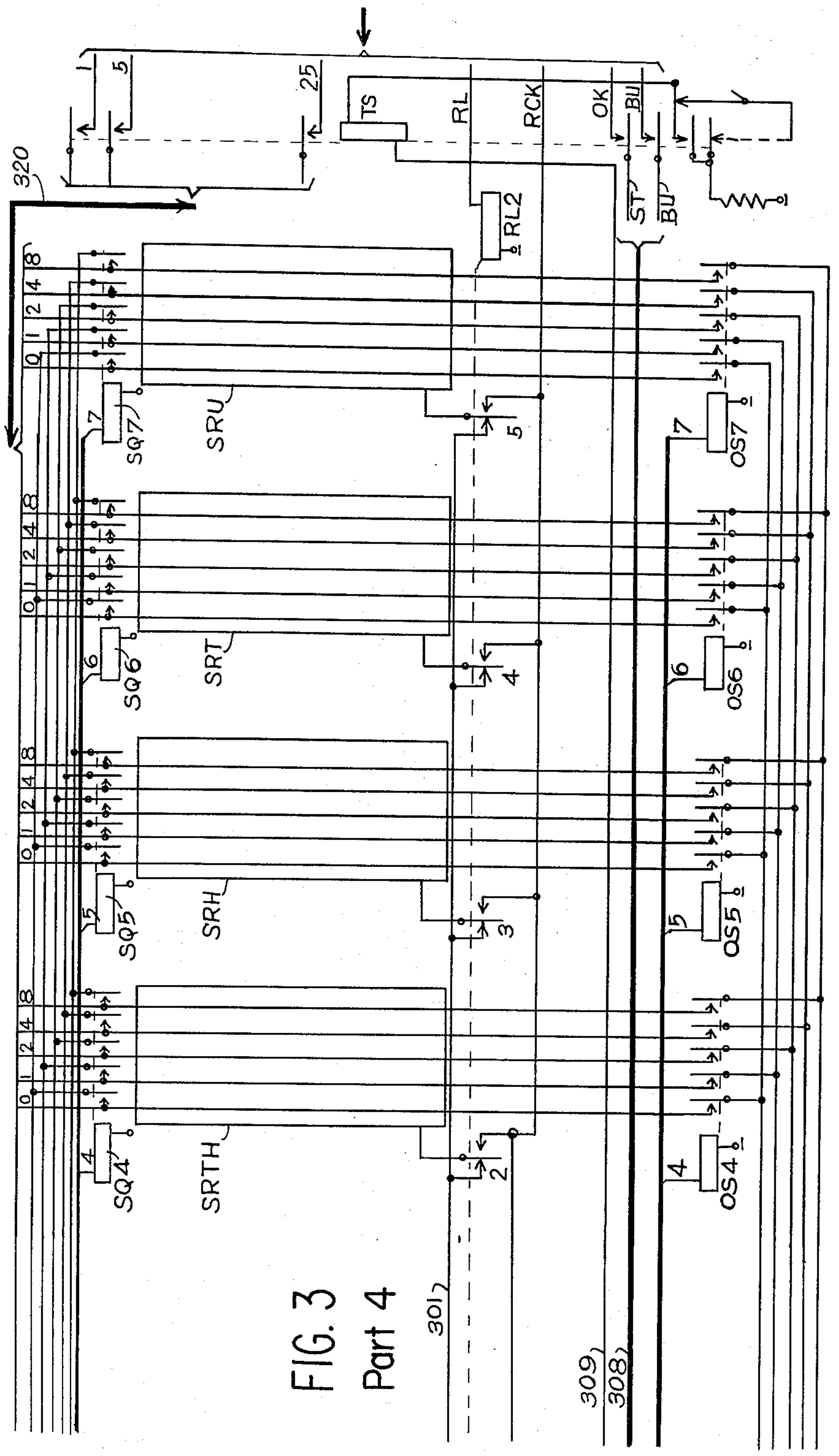
FIG. 3 Part 4

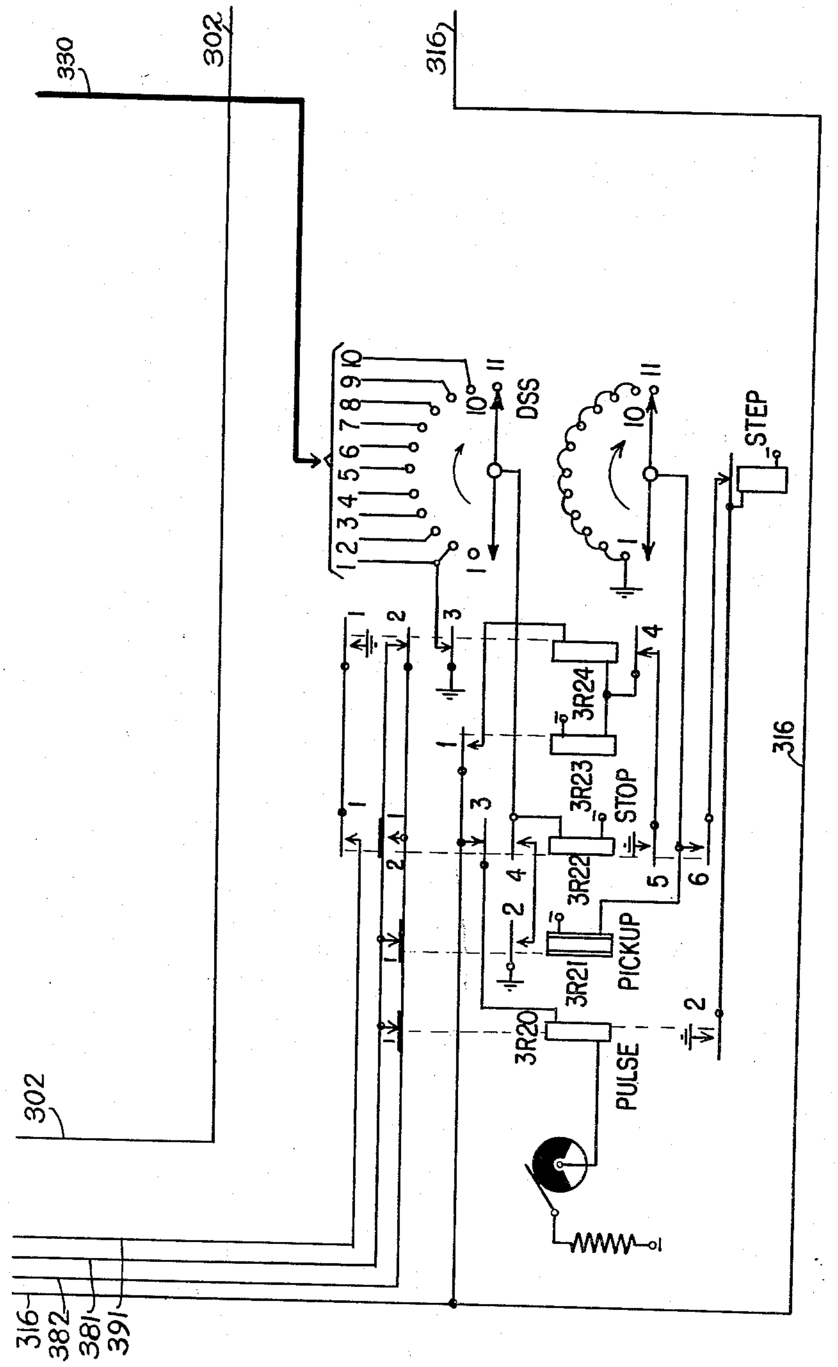
FIG. 3 Part 5

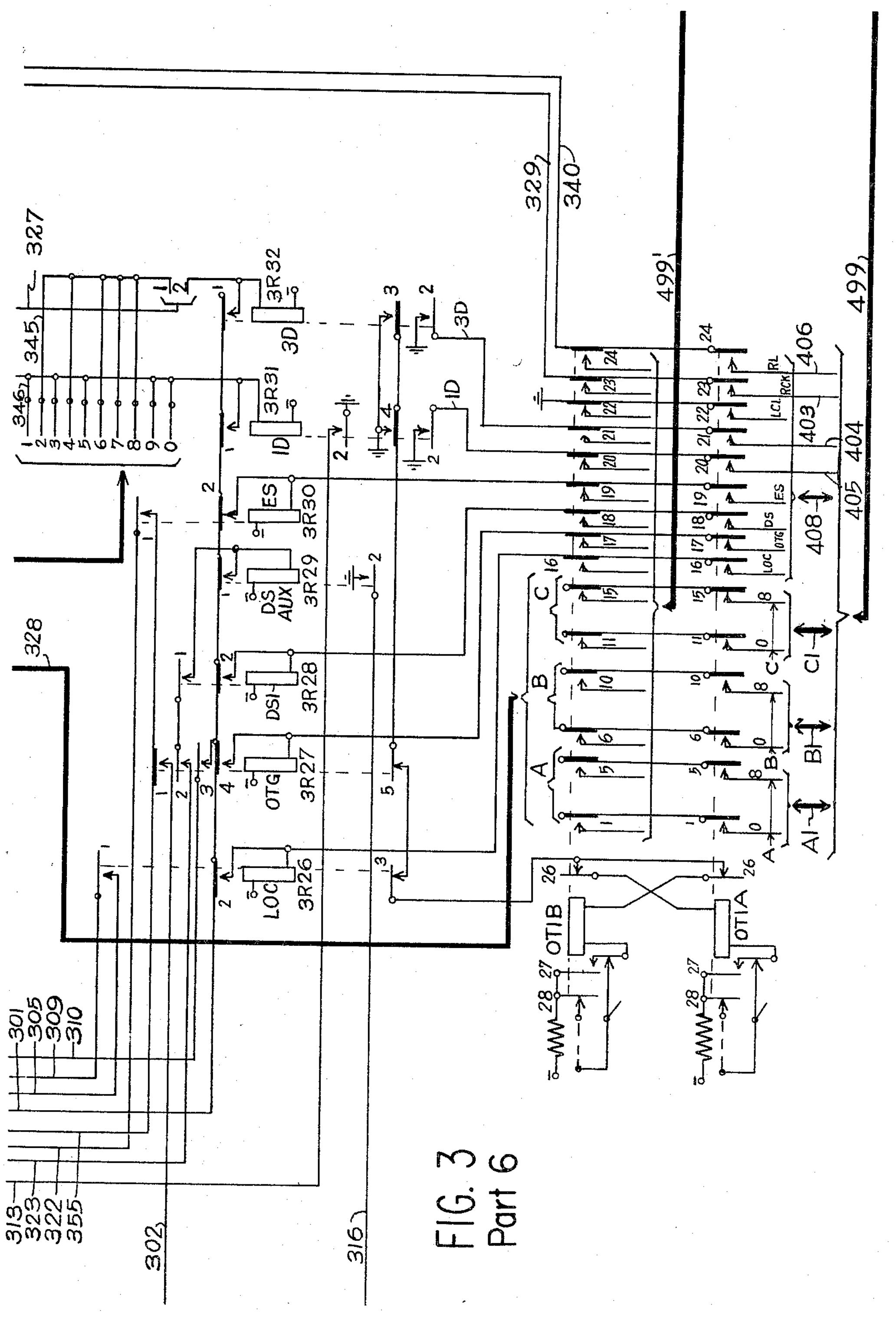
FIG. 3 Part 6

Aug. 29, 1961 J. C. GIBSON 2,998,493
OFFICE TRANSLATOR ARRANGEMENT FOR SWITCHING SYSTEMS
Filed Aug. 17, 1959 13 Sheets-Sheet 8
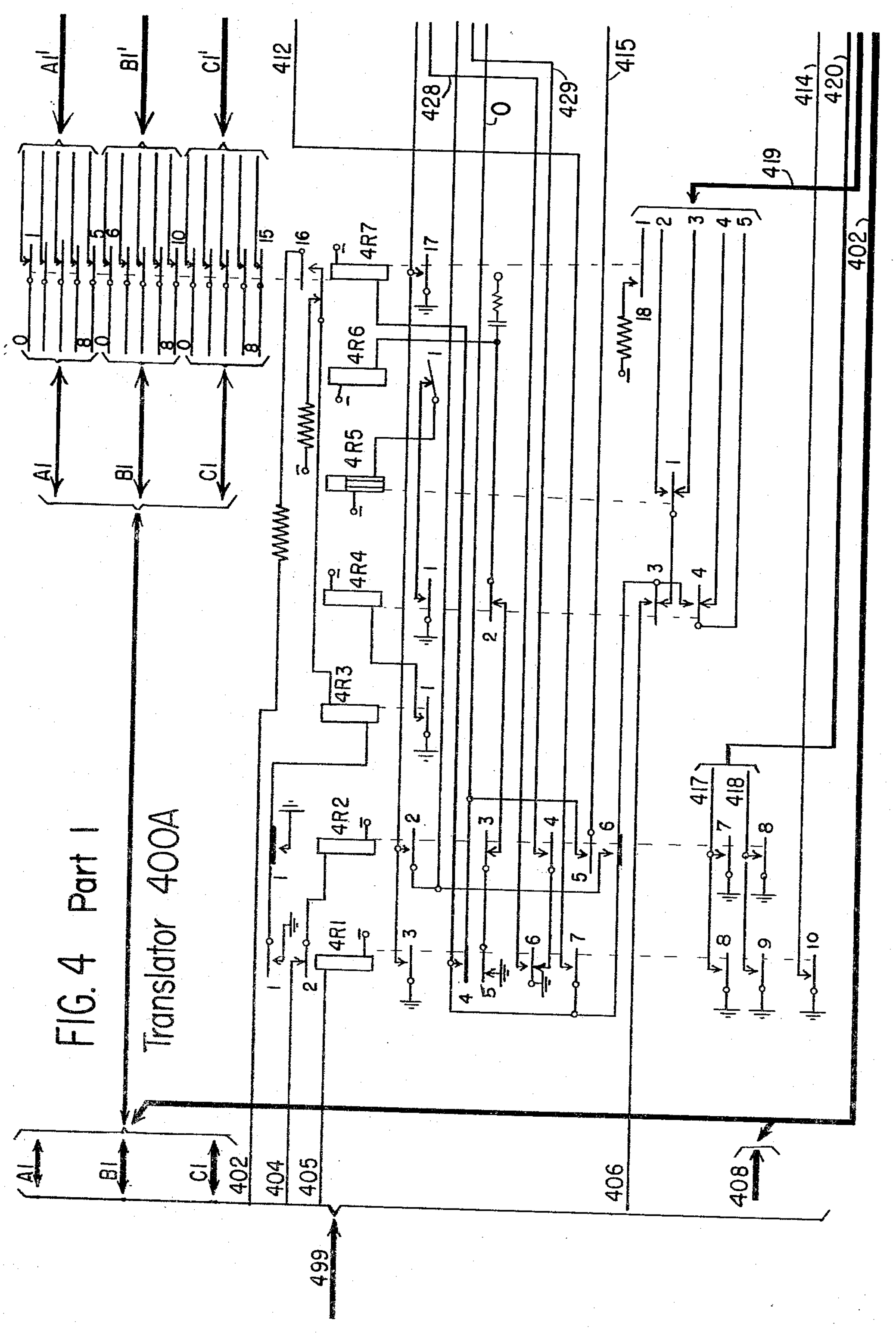
FIG. 4 Part I Translator 400A Aug. 29, 1961 J. C. GIBSON 2,998,493
OFFICE TRANSLATOR ARRANGEMENT FOR SWITCHING SYSTEMS
Filed Aug. 17, 1959 13 Sheets-Sheet 9
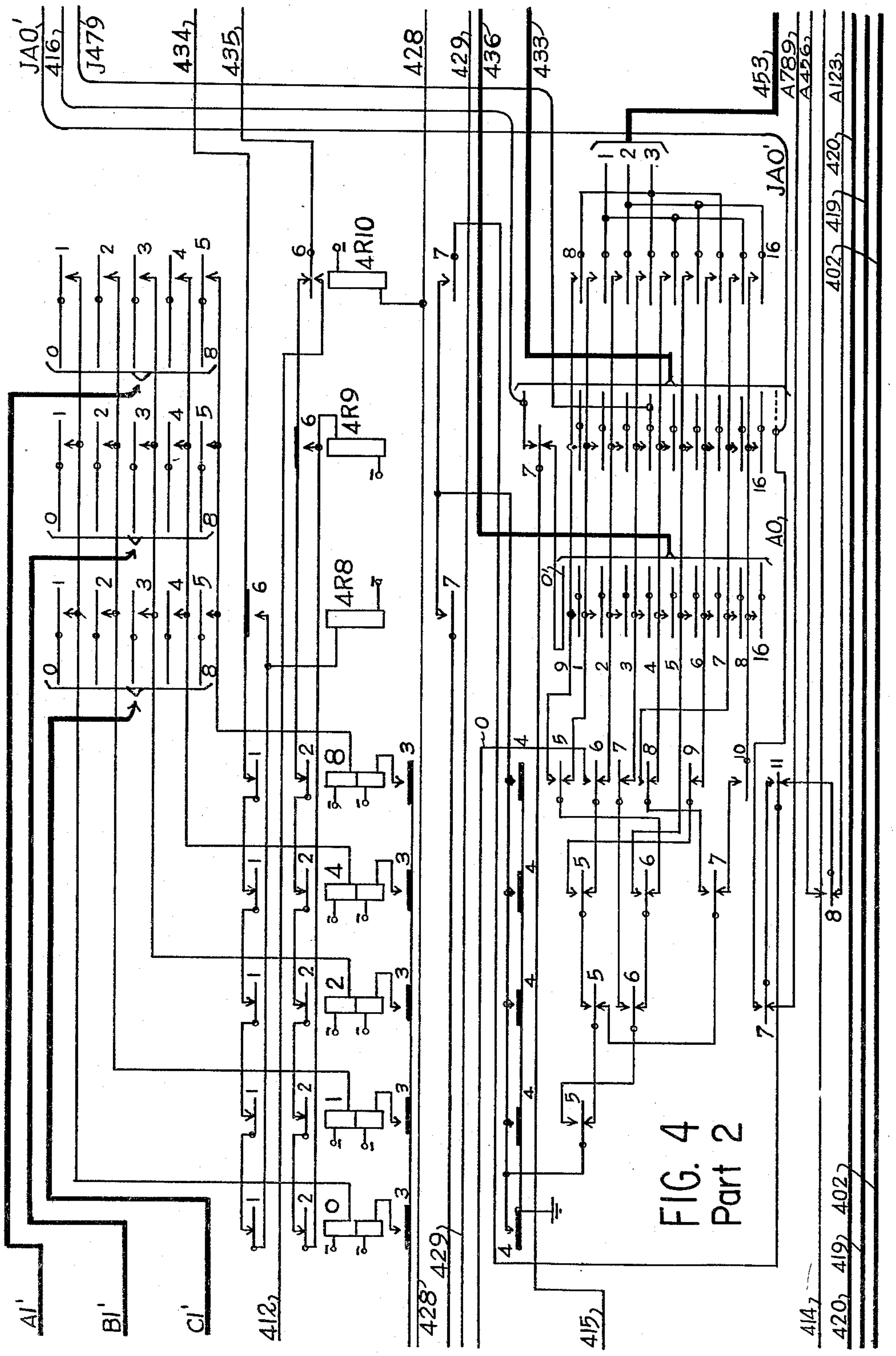
FIG. 4 Part 2

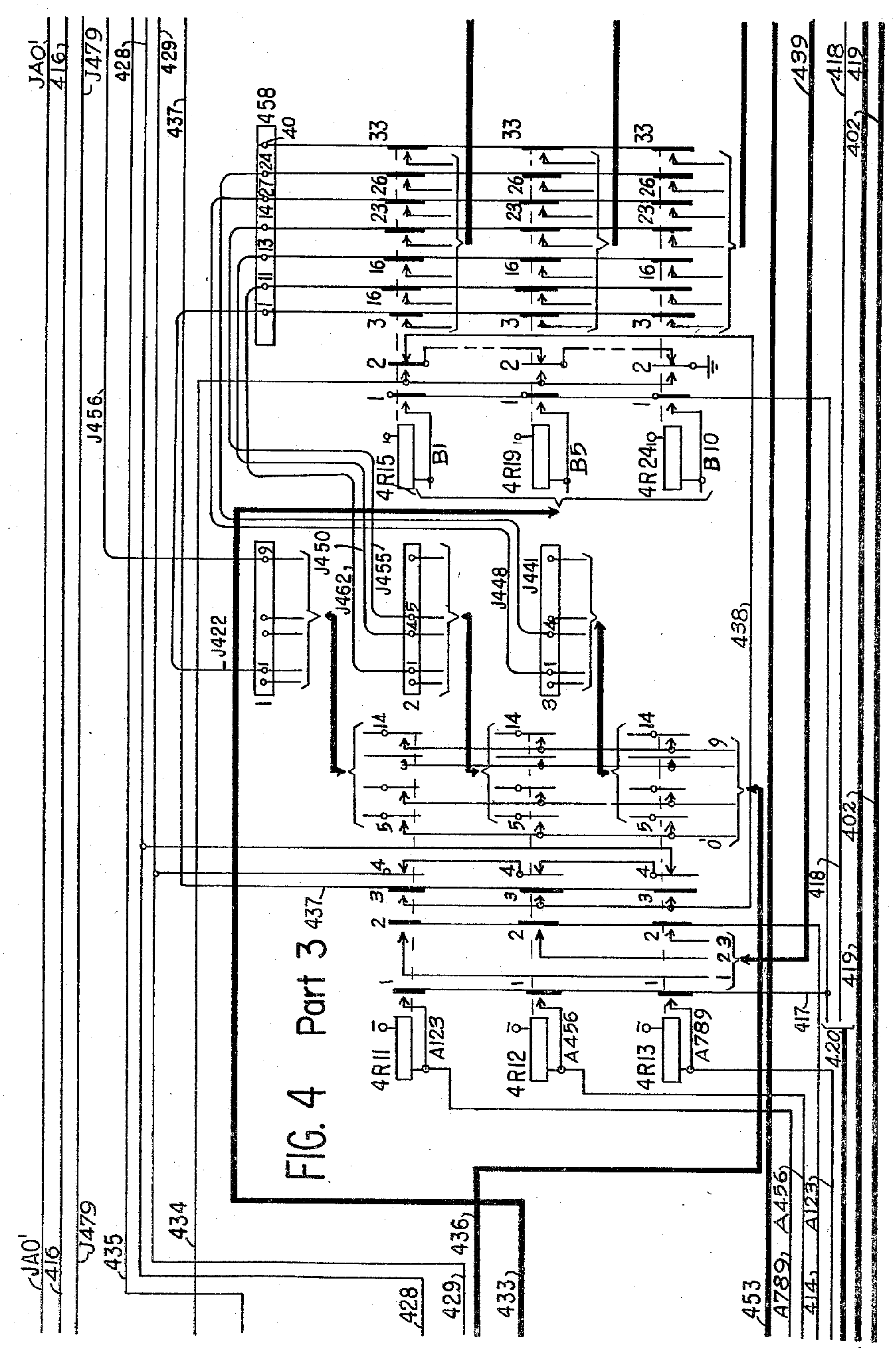
FIG. 4 Part 3

Aug. 29, 1961 J. C. GIBSON 2,998,493
OFFICE TRANSLATOR ARRANGEMENT FOR SWITCHING SYSTEMS
Filed Aug. 17, 1959 13 Sheets-Sheet 11
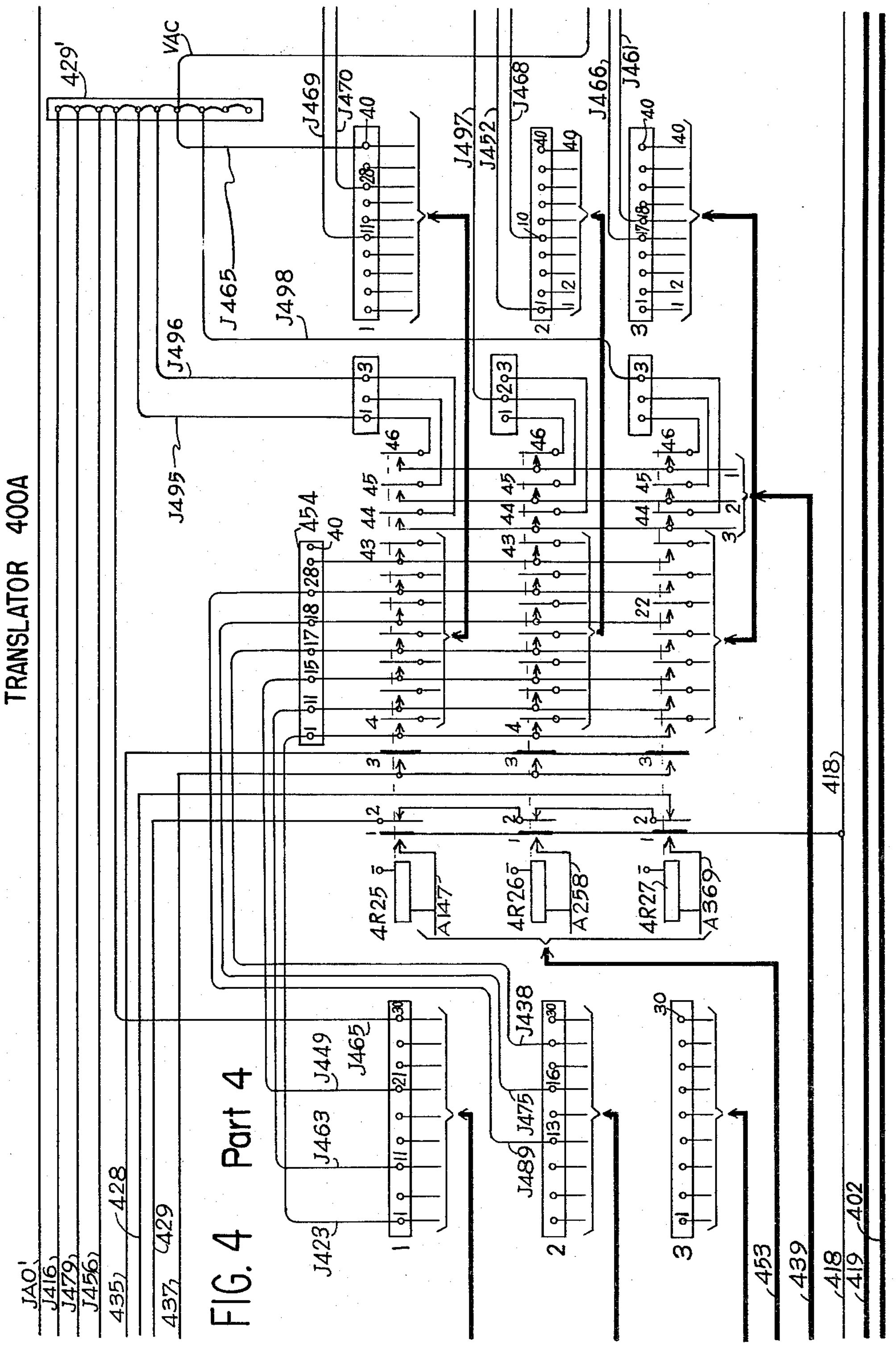
FIG. 4 Part 4

Aug. 29, 1961 J. C. GIBSON 2,998,493
OFFICE TRANSLATOR ARRANGEMENT FOR SWITCHING SYSTEMS
Filed Aug. 17, 1959 13 Sheets-Sheet 12
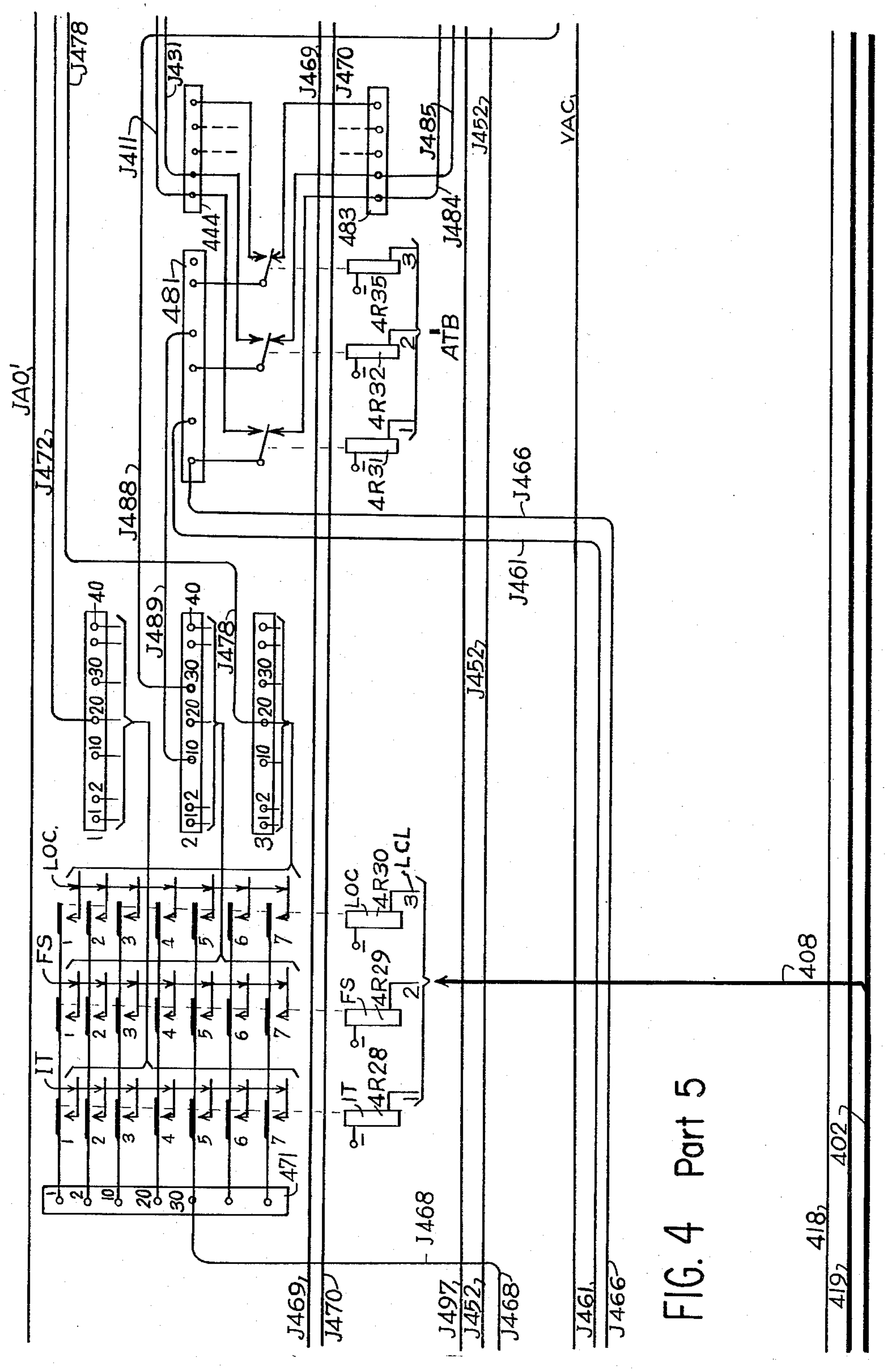
FIG. 4 Part 5

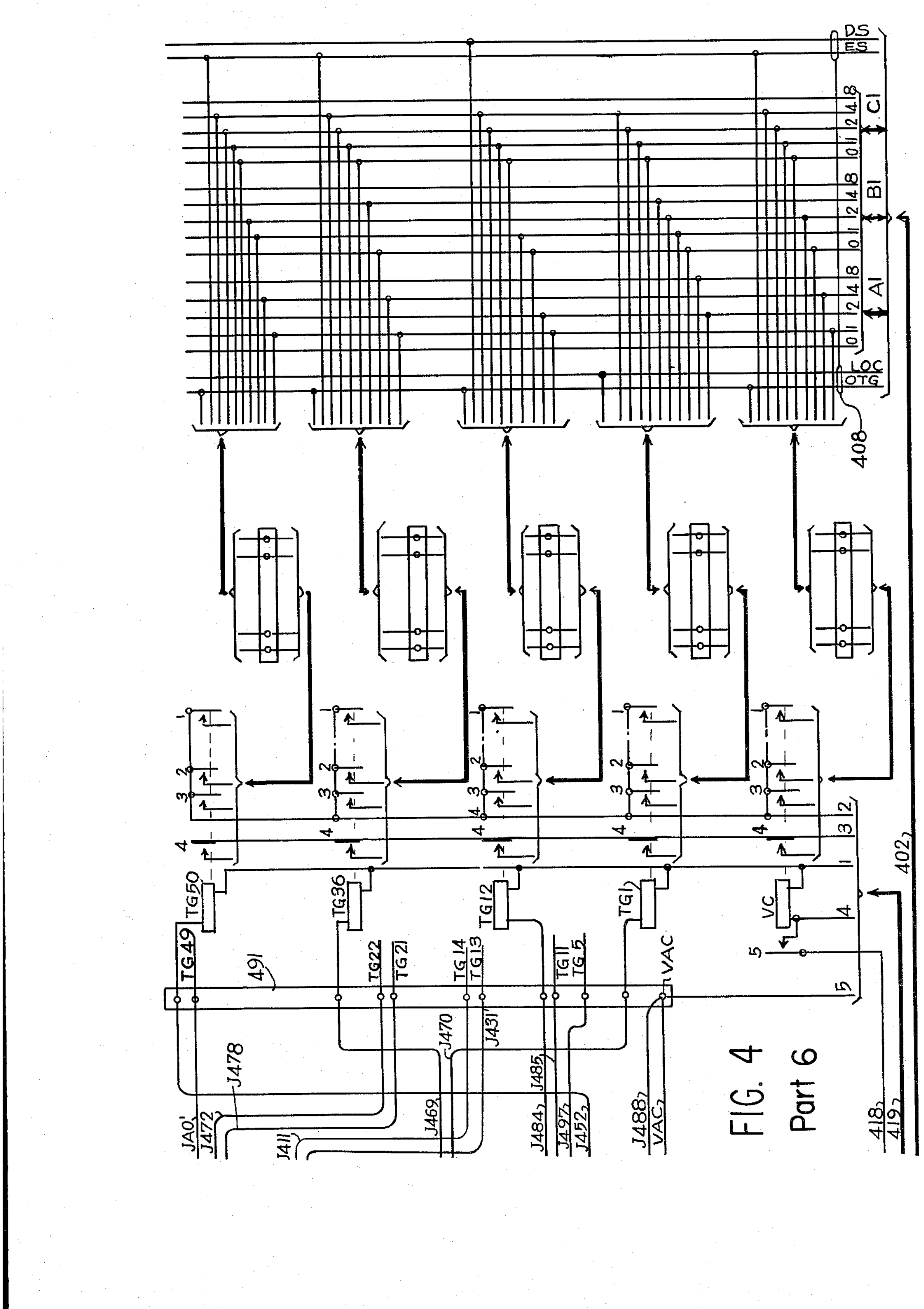
FIG. 4 Part 6

2,998,493
Patented Aug. 29, 1961

1

2,998,493

OFFICE TRANSLATOR ARRANGEMENT FOR SWITCHING SYSTEMS

John C. Gibson, Oak Lawn, Ill., assignor to International Telephone and Telegraph Corporation, New York, N.Y., a corporation of Maryland Filed Aug. 17, 1959, Ser. No. 834,284
16 Claims. (Cl. 179—18)

This invention relates to arrangements employed in multi-office switching systems for translating each received plural-digit office designation into routing information required to extend the connection to the designated office. A principal object is to provide translating arrangements of improved economy in relatively small switching networks in that the required number of translator contact sets is substantially reduced while still retaining full flexibility in assignment of office designations and permitting the calling of vacant office designations to result in a positive vacant-office marking.

Other objects relate to the incorporation of translators according to the invention into a system wherein they are common to two or more classes of register senders from which any such translator receives a called office designation, and to which the translator quickly sends the corresponding translated routing information.

Usually, plural-digit translators of the type here dealt with employ a relay tree, or its equivalent to provide alternative paths generally equal to ten raised to a power dictated by the number of digits in an office designation. Such a tree for 3-digit office designations may require 1000 such paths, and is so expensive in contact sets as to materially increase the cost of the switching system. Translators have been known which attempt a considerable reduction in translator contact sets by providing a separate plural-terminal office-detector relay for each used office designation, along with a separate group of marking terminals for each office-designating digit, for extension through assignment jumpers to the detector-relay terminals, whereby operation of an assigned detector relay occurs only when the office-digit combination assigned thereto is received. Such translators, however, have the practical difficulty that they cannot provide positive vacant-office marking except by using additional vacant-office detector relays, and so many of them are usually required that the intended economy is lost.

According to the invention, the foregoing and other difficulties are overcome in an arrangement comprising a single vacant-office relay and a separate routing relay for each existing office, by providing a succession of partial relay trees jumper-connectible in tandem to provide individual operating paths for the office routing relays, with operating paths for the vacant-office relay jumper-connectible through the first partial tree, for all designations thereby determinable as vacant, and jumper-connectible through the succeeding partial tree only when further digit information is required to determine vacancy, thereby keeping succeeding path requirements to a minimum.

A further feature resides in an arrangement wherein one partial relay tree is arranged with combinative values for a given digit, thereby permitting a reduced number of paths therethrough to suffice, with the combinative digit values represented by such paths being separated to the required extent by extension paths through a succeeding partial tree employing corrective combinative values for the noted given digit.

In the illustrative embodiment, wherein three office-designating digits (A, B, C) are used, combined A-digit and uncombined C-digit values are used in the first of three partial trees; required uncombined ones of the B-digit values are used in the second partial tree; and correctively combined A-digit values are used in the third partial tree.

Further translator features include (1) an arrangement for rendering a group (such as two) translators common to a larger group of register senders of more than one class, and requiring different routing-digit combinations, by providing class-indicating relays in the translators controlled by the seizing register sender, and (2) alternative-routing provisions called in by the busy condition of all trunks in the preferred path.

Features residing partly in the register senders include an arrangement whereby the translator informs the register sender (1) whether the call is to be locally terminated, with all digit transmission in code, or is outgoing, with all digits transmitted over a seized outgoing trunk being sent as decimal pulse groups, (2) which routing-digit positions are to be skipped, (3) the point at which the sending of digit-pulse groups is to begin, and (4) the point at which digit sending is to end.

The above-mentioned and other objects and features of this invention and the manner of attaining them will become more apparent, and the invention itself will be best understood, by reference to the following description of an embodiment of the invention taken in conjunction with the accompanying drawings, comprising FIGS. 1 to 4, wherein:

FIG. 1 is illustrative of a network of offices or exchanges A, B, C, D, and E, for which the office translator of the present invention provides translations on calls routed through office A;

FIG. 2 illustrates the trunking arrangement at exchange A, whereby the translator of the present invention functions to route respective local or interexchange calls;

FIG. 3, parts 1 to 6 illustrate a register sender 300A at exchange A for storing incoming digits and having access to the office code translators 400A or 400B, which control the transmission of digits from the sender to route the call to a proper destination;

FIG. 4, parts 1 to 6, illustrate one of the office translators 400A of the present invention; and FIG. 5, on the same sheet with FIG. 3, part 1, shows the manner in which FIGS. 3 and 4 are best arranged for comprehending the invention.

*General description*

It has been chosen to illustrate the invention as applied to, or for use with, the register senders of a crossbar system generally as disclosed in the application of E. J. Leonard et al, Serial No. 629,282, filed December 19, 1956, now Patent No. 2,918,533, except for such relatively minor departures therefrom as may appear from the drawings and the description to follow.

Referring now to FIG. 1, where a number of offices or exchanges A to E are illustrated, it will be seen that office A has, for example, access to exchange B and to offices C, D, and E over trunks indicated at 110, 111, 112, and 113 respectively and that each office B and each office C, D, and E has access to office A over trunks indicated at 114, 115, 116, and 117 respectively. In addition, there is illustrated alternate routing. One alternate route from office A provides access to office D over trunk 111 to office C and from there over trunk 118 to office D, and over another alternate route office A has access to office C over trunk 112 to office D, and from there over trunk 119 to office C, for example. It will also be understood that in addition, a toll operator, for example, at office A may have access over automatic switching equipment to other offices and exchanges, not shown, as in tandem through office or exchange B, for example, and vice versa.

In the trunking plan for office A illustrated in FIG. 2, the trunk 114 over which calls from office B are extended has access to an incoming selector indicated at IFS2, for example. Other incoming trunks 115, 116, and 117 from exchanges C, D, and E respectively have access to other incoming selectors, such as indicated by IFS1 for 117.

In accordance with the trunking plan, calls incoming from the respective offices may proceed in office A to either an operator's position (203, FIG. 2); to a called local subscriber (as 201, FIG. 2); or through the office-A switching equipment to a destination in one of the offices B, C, D, or E. Offices A, C, D, and E are, for example, a network as indicated by the dashed-line enclosure in FIG. 1 wherein local subscribers or operators in any of the offices A, C, D, or E may directly dial subscribers or operators in the other offices such as exchange A of the network. Local subscribers such as indicated for office A (FIG. 2) by the circle inscribing the reference character 200, have access through a conventional line circuit indicated at LC1 in FIG. 2 and through one of a number of conventional finder-selector links (indicated by Fl—LSl to FX—LFSX) for extending connections either to another local subscriber indicated by the circle inscribing the reference character 201; to an operator for special service; or to a subscriber for example in offices C, D, or E. In the case of calls to destinations outside the local network, such as to office B or beyond, a connection must first be established to a toll operator's position indicated at 203. The operator's position 203 has access over trunk 208 and through an operator's selector switch OFS for extending calls to any of the offices and in the example illustrated may extend an automatic connection through office B.

Referring to FIG. 3, respective selector switches LFS1—LFSX, on being seized by a subscriber originating a call in exchange A, control respective register-sender finder or access switches SS1—SS2 in any well-known manner to seize one of the local register sender 300A or 300B, for example. The subscriber's line loop is then extended to a local register sender such as 300A or 300B. Register senders 300A or 300B are generally similar to the register sender R1 disclosed in the said Leonard et al. application. Corresponding identifying characters are used as an aid in understanding the operation.

A call extended from exchange B, for example, results in seizing incoming selector IFS2 from which the connection is extended through associated finder switch SS4 to an incoming tandem register sender such as 250A or 250B over trunks 251 or 251' respectively. Likewise, a toll operator at office A on originating a call seizes an office selector switch OFS and is extended by means of finder switch SS5, for example, into one of the tandem register senders 250A or 250B. A connection originating from within offices C, D, or E is extended through the appropriate incoming selector such as IFS1 and an associated register finder switch such as SS3 to an EAS register sender such as 260A or 260B, for example, over trunk 261.

Each of the register senders 300A, 300B, 260A, 260B, 250A, or 250B has access to one of the office code translators 400A or 400B respectively, and in addition has access to one of the ten local number translators indicated at T0–T9 through associated access switches AS1–AS3 in a manner similar to that explained in the aforementioned application.

While the switching apparatus of office A is of the crossbar type disclosed in the said Leonard et al. application, the trunking plan shown in FIG. 2 uses the conventional symbols commonly employed for step-by-step switches, merely for the purpose of simplification.

Dialed or transmitted digits over respective trunks either from a local subscriber in office A, from an operator in any office, or from a subscriber in offices C, D, or E, are transmitted to the respective register senders 300A, 300B, 250A, 250B, 260A or 260B. In case of calls originating at different offices, the digits dialed or transmitted may differ to reach the same destination. Thus, a subscriber in office A, to reach another subscriber in office A, dials a 7-digit directory number comprising a 3-digit office code and a 4-digit subscriber number. A call from another office such as C, to the same called subscriber may originate with seven digits, but have only a 1-digit or a 2-digit office designation, when transmitted into register sender 260A, for example. Outgoing calls from office A to offices C, D, or E may have a 3-digit or a 1-digit office designation, followed by a 4-digit subscriber number. Likewise, calls proceeding to office B from any one of offices A, C, D, or E may be preceded by different office designation digits in order to reach the toll operator, who extends the connection to office B. In addition, special services provided at office A, such as by the information or zero operator, and recorded announcements for vacant codes may require 1, 2, or 3 office designation digits depending on where the call originates and to where it is proceeding. Thus, the same digits depending on the point of origination may have differing or the same destinations, and the office translator, which is common to the register senders in office A, must determine the destination in accordance with the digit values and the register sender in which they are stored. It will be understood that the office designation digits referred to are those transmitted from a calling connection and may actually correspond either to an office or an exchange or to a particular position therein, such as that of a long-distance operator.

As the register senders 300A, 260A, and 250A, etc. are alike in principle, only the local register sender 300A is illustrated in some detail. Therefore, for the purpose of illustrating the invention, calls originating in exchange A will primarily be discussed.

Referring to FIG. 3, register sender 300A comprises means including a line relay 3R3 and a digit switch DR for receiving dialed digits via trunk conductors T and R in trunk group 306 and converting the same in a two-out-of-five code for storage in the respective storage tanks SRA—SRU. The respective tanks are connected in sequence by relays SQ1–SQ7 to the switch DR under control of the incoming sequence switch ISS. The first three tanks SRA–SRC are used to store incoming office designation digits, and tanks SRTH—SRU store incoming subscriber digits. Tank SRC may be used for both types of digits if required, as explained in the aforementioned application.

The tanks SRA, etc. each comprise five relays 0, 1, 2, 4, and 8 having extended thereto corresponding leads 0, 1, 2, 4, and 8 whereby the relays are operated in a two-out-of-five code corresponding to respective digits. The following chart is illustrative of the markings on the respective leads 0–8 corresponding to respective digit values 0–9 whereby relays 0–8 are operated and also illustrates the respective relays 0–8, which are operated to mark one detecting chain lead with a corresponding decimal digit value:

| Digit and Marked Detection Chain Lead | Marked Leads | Operated Relays |
|---|---|---|
| 1 | 0,1 | 0,1 |
| 2 | 0,2 | 0,2 |
| 3 | 1,2 | 1,2 |
| 4 | 0,4 | 0,4 |
| 5 | 1,4 | 1,4 |
| 6 | 2,4 | 2,4 |
| 7 | 4,8 | 4,8 |
| 8 | 0,8 | 0,8 |
| 9 | 1,8 | 1,8 |
| 0 | 2,8 | 2,8 |

Detection chain leads, as at terminals 1 and 2 of SRB and SRL, are contemplated as being extended through a conventional two-out-of-five check chain, which is generally only indicated by single contacts on any relays 0–8 or not shown.

The first group of storage tank relays 0–8, in tank SRA extend a marking ground over 326 corresponding to the first digit of the received office designation. If the digit represents a 1-digit office code, it is extended directly to a 1-digit identification relay 3R31 (FIG. 3, part 6). Relay 3R31 then operates to cause the register sender 300A to seize the office translator 400A by operating translator seizure relay OT1A.

If the office designation is a 3-digit office designation, a 3-digit identification relay 3R32 is operated, when the third sequence relay SQ3 is operated under control of switch ISS, to extend the detection chain ground at its contacts. Relay 3R32 then causes the office translator 400A to be seized by operating relay OT1A. If the office designation is followed by subscriber digits, these are in the meantime sequentially registered in the remaining storage tanks.

The translator 400A of FIG. 4, parts 1 to 6, on being seized has extended thereto the 1-digit or 3-digit identification markings respectively for operating relays 4R1 or 4R2 respectively (part 1); a marking identifying the type or class of register such as local register 300A for operating relays 4R28, 4R29, or 4R30 respectively (part 5), and the digits stored in tanks SRA, SRB, and SRC. The translator 400A receives the office designation digits over cable groups A1, B1 and C1 in a two-out-of-five code and sequentially translates the same by means of relays O–8 (part 2) and 4R10, 4R9, and 4R8 into corresponding decimal code markings on detection chain leads 0–9 of part 3 relays 0 to 8.

The detecting relays 0–8 in the translator detect the first or A-office designation digit and extend detecting chain grounds corresponding thereto to two groups of three A-digit register relays 4R11–4R13 (part 3) and 4R25–4R27 (part 4). One detecting chain ground is extended over one grouping of wires A–123, A–456, or A–789 common to the respective digit groups 1, 2, 3; 4, 5, 6; or 7, 8, 9 to operate the corresponding one of A-digit register relays 4R11–4R13. The other detection chain ground is extended over either lead 1, 2 or 3 in cable group 453 and common to respective digit groups 1, 4, 7; 3, 5, 8; and 3, 6, 9 to operate the corresponding relay in the other A-digit register group 4R25–4R27 (part 4). Thus each A-digit register relay corresponds to a group of three A-digit values. The A-digit register relays 4R11–4R13 and 4R25–4R27 each therefore provides a combination of three first digits and the combination of two operated ones thereof corresponds to a single digit. The zero digit lead is treated specially, as in this case it represents a 1-digit office designation corresponding to the zero operator.

If a 1-digit office designation is involved, relay 4R1 (part 1) is operated from the register sender 300A. It extends ground through contacts of the two groups of A-digit register relays 4R11–4R13 and 4R25–4R27 so that a lead corresponding to the digit is identified. The identifying ground is transmitted to either a vacant code relay VC (part 6) or to a translation relay (such as TG50, part 6) for providing an appropriate routing as will be explained.

In the event the designation is identified as a 3-digit designation, relay 4R2 (part 1) is operated. The second digit is detected by the detecting relays 0–8 (part 2) and a corresponding one of the B-digit register relays 4R15–4R24 (part 3) is operated from a detection chain ground. If the B-digit does not correspond to a useable office code, it is jumper connected to the noted vacant code relay VC. The C-digit is then detected by the detecting relays 0–8 and the corresponding detecting lead 0–9 in group 436 is grounded. This detecting lead is extended along with the others through the operated contacts of the A-digit register relays 4R11–4R13 (part 4) to provide a ground marking corresponding to three A-digits and one C-digit. This marking may be jumper connected to the vacant code relay VC in the event it does not correspond to a useable office code and without completing an individual circuit therefor through the B register relays 4R15–4R24.

If the ground represents a useable office code, it is then extended to the B-digit register relay contacts. The resultant ground extended therefrom represents the combination of three A-digits, the C and the B digit. If it represents an unused code, it is extended to the vacant relay VC. If the combination represents a possible used designation, it is transmitted through the operated contacts of the other group of A-digit register relays 4R25–4R27 and from there transmitted to either the vacant code relay VC or a translation relay such as TG1 depending on its correspondence to a used office designation. Thus the number of contact sets is materially reduced, while enabling the use of a single vacant code relay to provide a positive vacant code marking.

In the alternative, if the treatment for the class of register varies, the ground is extended through a corresponding operated one of the register class identification relays 4R28–4R30 (part 5) to either a translation relay TG or the vacant code relay VC, as required. In addition, provision is made in the event alternate routes are provided as on calls through exchange C to D for extending the translation ground through the corresponding alternate route relay 4R31, etc. (part 5) to a translation relay such as TG1.

The operated translation relay TG1—TG50 or VC mark the leads 0–8 in groups A1, B1 and C1 for storing respective digits in the office designation register tanks SRA—SRC, respectively. As required, a skip digit 12 is also marked on leads 0, 1, 2 and 4 in groups B1 and/or C1 as required for a purpose to be further described. In addition, it marks either the outgoing or local leads OTG or LOC and control leads ES and DS, as required.

Lead OTG is marked to register sender 300A in all cases except when a subscriber in exchange A is being called. In that case, lead LOC is marked. The lead DS is marked to indicate to the register sender 300A that it should initiate decimal sending on being connected to a loop extending from office A, and lead ES is marked if no subscriber digits are to be transmitted from the register sender.

Referring again to FIG. 3, when the register sender 300A receives the markings from the translator, it restores its seizure relay OT1A (part 6), for example, to disconnect the translator 400A. The translator 400A is then made available for use with another register sender.

Shown below is a chart which is illustrative of the office designation digits stored in the tanks SRA—SRC on various types of calls by the subscriber indicated at 200 and the translated digit values returned by the translator and stored in the tanks SRA—SRC for extending the required connections. It will be noted from the chart that a calling subscriber and a short-haul toll operator at office A on extending a call to office B, dial the same digits 811. The subscriber being associated with register sender 300A receives one translated digit sequence, while the operator being associated with the incoming tandem register 250A, for example, instead of the local register 300A receives another digital sequence. The subscriber call will be routed to a short-haul toll operator over selector switch SS and trunk 207 while the operator who completes the call for him is routed over level 1 of switch OFS to trunk 110 extending to B. Also indicated by "X" marks are the subscriber digits which are stored in tanks SRTH—SRU. It will also be noted that the dialed office designation digits shown below comprise either 1 or 3 digits. Corresponding received digits from other exchanges may differ, but are stored in other register senders 250A or 260A, for example; however, the principle of operation is the same and may be accommodated by obvious additions or changes in strapping and/or contact location. The vacant code corresponds to any other office digit sequence from those shown and results in a routing over selector switch SS and trunk 204 to the recording announcer RA, which informs the calling party that he has dialed an improper or unuseable number.

| Call | Dialled Digit Stored in Tanks | | | | | | | Translated Digit Stored in Tanks | | | | | | |
|---|---|---|---|---|---|---|---|---|---|---|---|---|---|---|
| | SRA | B | C | TH | H | T | U | SRA | B | C | TH | H | T | U |
| 200 to 201 | 7 | 5 | 4 | X | X | X | X | 0 | — | 6 | 5 | 9 | 7 | 1 |
| Toll Operator to Office | 8 | 1 | 1 | — | — | — | — | 1 | 5 | 3 | — | — | — | — |
| 200 to Office B | 8 | 1 | 1 | X | X | X | X | 5 | 5 | — | — | — | — | — |
| 200 to Office C | 6 | 5 | 4 | X | X | X | X | 2 | 2 | — | X | X | X | X |
| Alternate to Office C | 6 | 5 | 4 | X | X | X | X | 3 | 5 | — | X | X | X | X |
| 200 to Office D | 6 | 5 | 3 | X | X | X | X | 3 | 3 | — | X | X | X | X |
| Alternate to Office D | 6 | 5 | 3 | X | X | X | X | 2 | 1 | — | X | X | X | X |
| 200 to Office E | 5 | — | — | X | X | X | X | 4 | — | — | X | X | X | X |
| 200 to Long Distance | 4 | 1 | 1 | — | — | — | — | 5 | 4 | — | — | — | — | — |
| 200 to Zero Opr | 0 | — | — | — | — | — | — | 5 | 5 | — | — | — | — | — |
| 200 to Intercept | X | X | X | X | X | X | X | 5 | 6 | — | — | — | — | — |
| 200 to Vacant Code | X | X | X | X | X | X | X | 5 | 2 | — | — | — | — | — |

The outgoing sequence switch OSS (FIG. 3, part 3) in register sender 300A is stepped to its first position to operate outgoing sequence relay OS1 for connecting the markings in tank SRA to the out-sending relays S0–S8. The translated digit stored in tank SRA is plus or minus out-marked by the register sender to control the associated selector switch LFS1, for example, to a corresponding position. This type of out-marking, for example, may be used in a crossbar system having a common controller of well-known type for respective switches, and the signalling and control paths therefor are only generally described hereinafter.

If the first selector switch is stepped to one of its first four levels in accordance with the digit marked in tank SRA, the call is outgoing to another exchange. In this case, the translator has extended ground on lead DS for operating the outgoing relay 3R28 (part 6) in the register sender 300A. The trunk conductors T and R are transferred from the plus and minus transmitting conductors indicated at 1181 (FIG. 3, part 2). Decimal sending under control of relay 3R20 and switch DSS therefore begins, after the first digit is plus and minus out-marked. The sequence switch OSS (FIG. 3, part 3) is stepped to the second position where it controls relay OS2 to connect the relays in storage tank SRB to outmarking relays S0–S8 (part 2). A detecting chain ground extended by relays S0–S8 marks a corresponding contact on switch DSS to terminate the pulsing of the outgoing loop by relay 3R20, when the number of pulses transmitted corresponds to the digit stored in tank SRB.

On calls to exchange E and in the case of calls to offices C or D, and on local calls to a subscriber in office A, tank SRB or SRC is marked from the translator 400A with the skip digit 12. Relays 0, 1, 2, and 4 in either or both tanks are operated thereby to cause switch OSS to immediately step past the storage tank, before the digit 12 can be transmitted under control of relays S0–S8.

In cases such as calls to an operator or resulting from a vacant code, switch LFS1 for example is stepped to its fifth level and connects to a second selector switch SS. Relay 3R28 (FIG. 3, part 6) is not operated, but relay 3R30 is operated on such calls, while a skip digit 12 is stored in tank SRC. The digit stored in tank SRB is plus and minus out-marked as for tank SRA to connect switch SS (FIG. 2) to trunk 204, 205, 206, or 207 accordingly, as relay 3R28 is unoperated. Switch OSS steps past storage tank SRC due to the skip digit stored therein and extends ground for operating the cut-off relay 3R1 (FIG. 3, part 1) under control of relay 3R30. In those cases, where the subscriber digits following the office designation must be transmitted either by plus or minus outmarking or decimally, switch OSS is stepped successively to each of its contacts to successively operate relays OS4–OS7. These relays connect the respective storage tank relays to relays S0–S8 to control these relays for transmitting each subscriber digit successively. It thereafter steps to its eighth contact where it operates the cut-off relay 3R1 under control of relay 3R27, if the call is outgoing from office A. If the call is to a subscriber within office A such as 201, relay 3R15 is operated under control of the connector switch C (FIG. 2) to operate relay 3R1.

Relay 3R1 releases the register sender 300A.

*Register sender seizure and digit storage*

The register sender 300A is seized in response to the initiation of a call from subscriber 200, through selector switch LFS1 and access switch SS1 in a manner similar to that explained in the aforementioned application. The subscriber's loop is therefore extended over conductors T and R respectively marked In of group 306 (FIG. 3, part 1), through break contacts 1 and 2 respectively of relay 3R1 to battery and ground respectively through line relay 3R3.

In the event the call was from office C, D, or E, the call would proceed through switches such as IFS1 and be extended into an EAS register sender such as 260A through access switch SS3. If the call were proceeding from office B and trunk 114 or an operator's position, indicated at 203 and over trunk 208, switches such as IFS2 or OFS respectively extend the call through respective access switches SS4 or SS5 into an incoming tandem register sender such as 250A. In any event, the call proceeds in a manner similar to that described below for the local subscriber.

Relay 3R3 operates its contacts 1 to energize the slow-to-release hold relay 3R4, which operates relay 3R5. Relay 3R5 at contacts 2 extends ground over lead S marked In of group 306 to hold the switch train seized. Relay 3R5 also closes its contacts 1 to connect dial tone through the condenser connected to conductor T from off-normal springs of switches DR and ISS in series to signal the subscriber that he may initiate dialing. At contacts 4, relay 3R5 prepares a circuit for slow-to-release relay 3R6 and for Step of DR. At contacts 5, relay 3R5 extends ground over hold conductor 301.

The subscriber, on operating his dial, opens and closes the loop extending over conductors T and R to line relay 3R3, a number of times corresponding to the digit dialed. This digit will generally be the first digit of the previously charted office designations, available to the subscriber. By mistake he may also dial an unused or vacant code. Relay 3R3, therefore, pulses its contacts accordingly. Relay 3R4, being slow-to-release, holds operated during the digital pulses, while each closing of the break contacts 1 on relay R3R extends ground over contacts 4 of relay 3R5 to pulse the stepping magnet of the digit register switch DR. The switch DR is accordingly stepped to a position corresponding to the dialed digit. On its first step the off-normal springs open to remove the dial tone.

Slow-to-release relay 3R6 also energizes on the first pulse over the stepping magnet circuit. It opens the incomplete circuit to the release magnet of switch DR at its contacts 1 before the off-normal springs On close on the first step. At contacts 2 and 3, it opens points in an incomplete circuit for forwarding ground to the wipers of the respective levels A and B of switch DR. At contacts 1, it also operates slow-to-release relay 3R7, and at contacts 4 causes stepping magnet of switch ISS to step its wipers.

Contacts 2 and 3 of relay 3R7 prepare respective points in circuits for forwarding ground to the respective wipers of switch DR.

At the end of the dialed digit, relay 3R6 restores its contacts 1, 2, 3, and 4. With switch ISS on contacts 1 and contacts 4 on relay 3R6 released, ground is extended over lead 1 in cable group 312 to energize the first sequence relay SQ1. Relay SQ1 at its contacts 1–5 connects leads 0–8 from the contacts of switch DR through cable 314 to the A–digit storage tank relays 0–8 in storage tank SRA. Relay 3R6, therefore, also extends ground over contacts 2 and 3 on relay 3R7 and the respective wipers of the minor switch DR to mark the five conductors 0, 1, 2, 4, and 8 in group 314 in accordance with a well-known two-out-of-five code corresponding to the dialed digit. The ground markings are extended over the five conductors shown connected through cable 314 and contacts 1–5 on sequence relay SQ1 to operate the corresponding combination of two of the five relays 0–8 in the first digit storage tank SRA. Thus, the first dialed digit is stored in a two-out-of-five code, as are succeeding digits.

Slow-to-release relay 3R7 starts to restore, when contacts 1 on relay 3R6 open. On restoring, it completes at its contacts 1, a circuit for the release magnet of minor switch DR. The switch wipers are, therefore, sent home, and the off-normal springs On open to restore the release magnet circuits. The switch DR is now prepared to receive the next dialed digit. Switch ISS remains on its first contact, as its release magnet circuit is held open at contacts 3 of relay 3R5.

The two operated ones of relays 0–8 in tank SRA, each close respective contacts 2 during the interdigital pause to lock operated to ground on lead 301 grounded by contacts 5 of release-auxiliary relay RLA. The operated A-digit storage tank relays also complete a digit chain circuit through respective back contacts from ground and to extend ground over one of the leads 0–9 corresponding to the dialed digit in any well-known manner. These leads are connected over cable 326 and jumpered in accordance with the code assigned to office designations having a particular first digit. Thus, the first digit may, for example, be 2, 4, 6, 7, or 8, which indicate a 3-digit office designation. The corresponding detection chain leads 2, 4, 6 7, and 8 in cable 326 are, therefore, jumper connected over jumper 345, for example, to lead 1 in cable 327 for operating relay 3R32, after the third office designation digit is stored, as will be explained. Other detection chain leads corresponding to 1-digit office designations or vacant codes are connected over jumper J346, for example, to the 1-digit identification relay 3R31, or may be absorbed, if desired, by merely omitting the cross connection. Ground connected to relay 3R31 operates it, to initiate seizure of the office translator such as 400A immediately, without waiting for the registration of further digits, as will be explained.

Relay 3R31 is operated while switch ISS is on its first contact. It grounds lead 313. The ground on lead 313 is extended over level-A contacts 1 and 2, past the self-interrupting contacts of the stepping magnet of ISS to step the switch ISS self-interruptedly. The switch wipers are, therefore, stepped over the respective contacts 1 and 2 to contact 3.

In the case of a call to office E, the single-digit office designation 5 is then followed by four subscriber digits. The first subscriber dialed digit causes switch ISS to step to contacts 4, and the successive digits are now registered in tanks SRTH, SRH, SRT, and SRU as described. In the event such digits are not dialed, switch ISS simply remains on contacts 3, until the register is released as will be explained.

A second dialed digit of the office designation pulses line relay 3R3, and it in turn causes switch DR to be stepped accordingly, as described. Relay 3R6 and the stepping magnet of incoming sequence switch ISS are again energized. Switch ISS steps to its second contact to release relay SQ1; however, the operated storage relays in tank SRA remain locked up.

During the interdigital pause, relay 3R6 restores to extend ground over switch ISS level–B, lead 2 in group 312 to energize the second sequence relay SQ2. Relay SQ2 connects leads 0–8 in group 314 to the B-digit storage tank SRB. Ground markings in a two-out-of-five code corresponding to the second digit are, therefore, transmitted over leads 0–8 in cable group 314 as explained. This time, however, the markings are extended past two of the operated make contacts 1–5 respectively of sequence relay SQ2 to operate two relays in group 0–8 in the storage tank SRB. These relays lock to ground past respective locking contacts as shown for relays in tank SRA, to ground on lead 301. Switch DR is returned home, as explained, while switch ISS remains on its second contact.

The subscriber on dialing the third or C digit of the office designation now causes the digit to be stored in the storage tank SRC in a two-out-of-five code as explained for storage tanks SRA and SRB. Switch ISS is stepped to its third position to operate relay SQ3 over lead 3 in cable group 312 for connecting the leads 0–8 in group 314. The relays in tank SRB remain operated over their locking circuits, while relay SQ2 restores. Relay SQ3 also connects lead 1 in group 327 to lead 2 in group 327. Ground is, therefore, forwarded from one of the detection chain leads 2, 4, 6, 7, or 8 controlled by tank SRA to operate relay 3R32. Relay 3R32 causes seizure of one of the office translators such as 400A, as will be explained.

If no further digits are dialed, switch ISS remains on contacts 3 until the sender 300A is restored, while switch DR is sent home, as explained.

The operated storage relays 0–8 in tank SRC lock operated over contacts 3 on relay RL1 and contacts 1 on relay RL2 to ground on lead 301. Relay RL2 is controlled from one of the number group translators T0–T9 as explained in the aforementioned application. Tank SRC is emptied of a stored digit from the office translator to permit a digit to be stored therein from one of the number group translators T0–T9, if the call is to a subscriber in office A as explained in the aforementioned application.

If four subscriber digits following the office designation need be dialed, they are stored successively in storage tanks SRTH, SRH, SRT, and SR4 respectively, as explained for tanks SRA, SRB, and SRC. The respective sequence relays SQ4, SQ5, SQ6, and SQ7 are each operated successively over leads 4, 5, 6, and 7 in group 312, before the corresponding digit is stored in the associated respective tanks SRTH, SRH, SRT, and SRU, as explained for tanks SRA, SRB, and SRC. The respective operated storage relays in tanks SRTH, SRH, SRT, and SRU in this case lock through contacts 2, 3, 4, and 5 on release relay RL2 to ground on lead 301. However, long before this operation is completed, the office translator is seized and completes its function.

*Translator seizure*

Relay 3R31 or 3R32 operates responsive to the first stored digit or third stored digit of the office designation digits, as explained. Each, on operation, locks to ground on lead 301 at contacts 1. At contacts, 2 each grounds an identification lead 1D or 3D respectively for identifying the number of digits in the office designation to the office translator.

At contacts 4 and 3 respectively of relays 3R31 and 3R32, ground is extended over contacts 5 of relay 3R27 and contacts 3 on relay 3R26, through contacts 26 on each of the two chain connected office translator seizure relays OT1A and OT1B. The ground is extended to battery through the respective break contacts of each relay OT1A and OT1B, and a respective chain circuit extending through similar break contacts indicated by the dashed lines on similar relays in other registers having access to the respective office translators 400A and 400B. If no relay in the respective associated chain is operated, the circuit to battery is completed. Relay OT1A has access to office translator 400A, while relay OT1B has access to office translator 400B.

Assuming that relay OT1A operates from the ground, it opens the circuit at its contacts 26 for relay OT1B to prevent its operation or vice versa, if relay OT1B is operated. It likewise opens the chain circuit at contacts 27 and 28 and connects the battery directly to its winding to prevent a chain relay in another register sender such as 300B having access to office translator 400A from operating to seize the translator 400A. At contacts 1–15, it extends the respective storage tank leads 0–8 from each storage tank SRA, SRB, and SRC respectively through cables A, B, and C respectively through cables A1, B1, and C1 respectively and cable 499 to the office translator 400A. Leads 1D or 3D are marked by ground depending on whether a 1-digit or 3-digit office designation was registered. They are extended through contacts 20 and 21 respectively to leads 405 and 404 respectively in cable 499. The ground on leads 405 or 404 in cable 499 operates a coresponding 1-digit or 3-digit identification relay 4R1 or 4R2 respectively in the translator 400A. Translator control leads LOC, OTG, DS and ES are also connected from contacts 16, 17, 18 and 19 through cables 408 and 499 into the translator 400A. Relay OT1A also extends a local ground marking over contacts 22 and lead LCL in cables 408 and 409 to operate local register identification relay 4R30 (FIG. 4, part 5) indicating to the translator that the associated register is a local register.

If the seizing register is other than local, such as one of the registers 250A or 260A, that register extends a corresponding identification marking over a corresponding lead in cable 499 to operate either relay 4R28 or 4R29 (FIG. 4, part 5) respectively to identify the register sender to the translator.

*Digit registration in office translator 400A*

The translator 400A (FIG. 4) is seized, as described, from one of the register senders, and ground is extended over lead 404 or 405 in cable group 499, depending on whether a 3-digit or 1-digit office designation has been registered, as explained. If a 3-digit designation has been registered, the ground on lead 404 is extended past contacts 2 on relay 4R1 to operate relay 4R2. If a 1-digit office designation has been registered, ground on lead 405 operates relay 4R1.

At contacts 1, delay 4R1 or 4R2 extends ground through the winding of relay 4R3 to resistance battery over break contacts on relay 4R7 to energize relay 4R3. Relay 4R2 closes contacts 2 and 6 to prepare operating circuits respectively for the lower windings of the detecting relays 0–8 and for relay 4R7. At contacts 5, it extends an 0 detecting chain lead from contacts of detecting relays 0–8 (part 2) over lead 415 to contacts 7 of relay 4R9. At contacts 7 and 8 respectively, it grounds leads 417 and 418 to provide respective lock-up grounds over cable 420 for the A-digit register relays 4R11—4R13 and 4R13—4R24 and for the B-digit register relays 4R25—4R27 and for the vacant code relay VC (parts 3, 4, 6). At contacts 3, relay 4R2 interrupts the circuit to the normally operated time-out relay 4R6. Relay 4R6 is held slow-to-release by the timing circuit comprising the capacitor and resistance connected thereto. It performs a timing alarm function (not shown) in which an alarm is operated in any well-known manner on its release, due to the translator 400A failing to perform its function in an allotted time period. At contacts 4, relay 4R2 extends ground over lead 429 from contacts of relay 4R1, through respective chain contacts 4 on relays 4R11—4R13 and respective chain contacts 2 in shunt therewith on relays 4R25—4R27 and over lead 428, to provide another circuit path to energize relay 4R10.

Relay 4R3, on energizing, closes its contacts to energize relay 4R4. Relay 4R4 closes contacts 1 to complete a circuit to slow-to-operate relay 4R5 over still-operated make contacts of relay 4R6. At contacts 2, relay 4R4 opens another point in the circuit to the time-out relay 4R6, and at contacts 3 and 4 prepares a circuit for extending vacant code ground from lead 5 in cable 419 to the release relay 4R7 and also over lead 405 to the register 300A. Relay 4R5, at contacts 1, prepares a circuit for marking lead 2 in cable 419 extending to the contacts of the translation relays.

Relay 4R10, on operating, closes its contacts 1–5 to extend conductor group A1 (five marking leads 0–8 from the first storage tank SRA of the register) to respective ones of the five detecting relays 0–8 of FIG. 4, part 2. These leads are marked by ground in accordance with the described two-out-of-five code to indicate which one of the digits 0 to 9 is stored in A-digit tank SRA of FIG. 3, part 3. The ground markings corresponding to the first digit of the dialed office designation are, therefore, extended to operate two of the five relays 0–8 in accordance therewith. At contacts 6, relay 4R10 opens a possible circuit for relay 4R9. At contacts 7, relay 4R10 prepares a circuit to leads A0, A–123, A–456, and A–789 controlled by relays 0–8 for operating a translation relay or one of the first group of three A digit register relays 4R11—4R13. The A digit register relays 4R11—4R13 each individually correspond to three digits of the respective groups 1–3, 4–6, and 7–9, respectively. At contacts 8–16, relay 4R10 connects respective detecting chain leads 1–9 controlled by the detecting relays 0–8, as will be explained, to a corresponding one of the other group of three A digit register relays 4R25—4R27. The connecting arrangement for the relays 4R25—4R27 is one wherein one detecting lead from each of the respective three groups 1–3, 4–6, and 7–9 are connected in common over leads 1, 2, and 3 in cable 453. Thus, these A register relays 4R25—4R27 correspond to the digit groups 1—4—7, 2—5—8, and 3—6—9, respectively, whereby the combined operation of one relay in each group 4R11—4R13 and 4R25—4R27 represents one A digit.

The markings extended from the register to detecting relays 0–8 result in the operation of two of them for extending a detecting chain ground corresponding to the digit. The ground is first extended through a well-known two-out-of-five checking chain indicated by contacts 4 on each of relays 0–8 and then in accordance with any one of the digits 0–9 to mark corresponding leads, as shown in the following chart:

| Operated Relays | Grounded Detection Chain Leads |
|---|---|
| 1 and 0 | 1, A–123 |
| 2 and 0 | 2, A–123 |
| 2 and 1 | 3, A–123 |
| 4 and 0 | 4, A–456 |
| 1 and 4 | 5, A–456 |
| 4 and 2 | 6, A–456 |
| 4 and 8 | 7, A–789 |
| 0 and 8 | 8, A–789 |
| 1 and 8 | 9, A–789 |
| 8 and 2 | 0, A0 |

The detection relays 0–8 on receiving the first stored digit of the office designation extend ground to an individual, one of nine detection chain leads 1–9 or the two detecting chain leads 0 and A0 each corresponding to zero. Ground extended over the detection chain leads 1–9 is extended past contacts 8–16 of relay 4R10 to one of the leads 1, 2, or 3 of cable group 453 to operate one of the A digit register relays 4R25—4R27. The ground extended from the two-out-of-five checking circuit indicated at contacts 4 on relays 0–8 also is extended past contacts 7 on relay 4R10 through detection chain contacts on detecting relays 2, 4 and 8 respectively to one of three leads A–123, A–456, or A–789 to operate one A digit register relay in group 4R11—4R13 corresponding to a digit in one of the three digits groups 123, 456, or 789. Leads 0 and A0 are not grounded in the event relay 4R2 is operated, as no 3-digit registration has the first digit 0, and the registration of 0 as a first digit results in the operation of relay 3R1.

The operated A digit register relays 4R11—4R13 and 4R25—4R27 at respective contacts 1 complete respective locking circuits to ground on leads 417 and 418 respectively. At respective contacts 4 on relays 4R11—4R13 and 2 on relays 4R25—4R27, leads 428 and 429 are disconnected to open the circuit to relay 4R10.

Relay 4R10, therefore, restores, but the operated ones of the relays 4R11—4R13 and 4R25—4R27 remain operated by ground on leads 417 and 418 respectively. The operated relay in the first group of A digit-register relays 4R11—4R13 closes its contacts 3 to extend ground from lead 438 and the serially arranged break contacts 2 on the B digit-register relays 4R15—4R24 to lead 437 and contacts 3 of operated relay in the other group of A digit-register relays 4R25—4R27 to lead 435.

With relay 4R10 restored, the detection relays 0–8 are disconnected from the respective marking leads in group A1. They, therefore, restore to remove ground from the detection chain lead. The ground on lead 435 is, therefore, also extended over the contacts 6 on relay 4R10 and serial chain contacts 2 of the detecting relays 0–8 to energize relay 4R9.

Relay 4R9 closes its contacts 1–5 to connect the five B digit marking leads 0–8 extending from the second storage tank relays SRB in the register and over cable groups 499, B1, 401, break contacts 6–10 of relay 4R7 and cable group B1′ to the detecting relays 0–8. At contacts 6, relay 4R9 shunts the series contacts 4 on detecting relays 0–8. At contacts 7–16, it extends the respective detection chain leads 0–9 over cable group 433 to the respective B digit register relays 4R15—4R24. As indicated by jumper J479, some of these leads may be jumpered to the vacant code terminal VAC to operate relay VC, as will be explained. This is done in the event of the corresponding B digit, such as 0 or 4, is not part of any used office designation.

The detecting relays 0–8 in responding to the marking extended over two of the conductors in group B1 extend a detection chain ground over one of the leads 0–9 corresponding to the second digit of the registered office designation. Although in none of the described calls is the digit 0 used as a B digit, in the event it were dialed inadvertently, it could be registered and relay 4R2 is operated, as explained. In this case ground is extended over detection chain lead 0, contacts 5 on relay 4R2 and over contacts 7 on relay 4R9 to jumper J416 and terminal VAC. In this case ground is not extended over lead A0, as relay 4R10 is restored. Alternatively, as indicated by the dotted connection into cable group 433 it can be extended to operate a corresponding B digit relay such as 4R24. In any event, the detection ground is extended over one of the contacts 7–16 of relay 4R9 and connected over cable group 433 to operate the individually corresponding one of the B digit register relays 4R15—4R24, if the B digit corresponds to one used in the calling office designations such as 1 and 5. If the particular B digit corresponds to an unused translation it is jumpered, as for example, shown by jumpers J479 and J416, to the vacant code terminal VAC, as stated before. This terminal is then connected through the winding of relay VC, as will be explained. In addition, the operated ones of the detecting relays 0–8 open the original operating circuit for relay 4R9 at contacts 2; however, these contacts are shunted, as explained.

The operated B digit register relay, for example relay 4R19 corresponding to the B digit 5, opens its break contacts 2 to remove ground from leads 438 and 437 and restore relay 4R9. It also closes make contacts 2 to extend the operating ground from contacts 2 on relay 4R24 over lead 434. Relay 4R19 locks operated over contacts 1 to ground on lead 417. At the operated contacts 3–33, it extends, for example, jumper J455 and other jumpers, mostly not shown, from the terminals 1–30 on strip 458 extending from the ten terminals on each of strips 1, 2, and 3 individual to the respective A digit register relays 4R11—4R13.

With relay 4R9 restored to disconnect the B digit register marking leads 0–8 at contacts 1–5 from the detecting relays 0–8, the two operated ones of these relays restore. They each close their respective serial contacts 1 to extend the ground on lead 434 for operating relay 4R8.

Relay 4R8 closes contacts 1–5, thereby connecting the C digit marking leads 0–8 from cable groups C1′, 401, C1, and 499 and the storage tank SRC to the detecting relays 0–8. At contacts 7, it prepares an energizing circuit for the lower winding of whichever ones of the detecting relays 0–8 are operated. At contacts 6, it shunts the series-connected contacts 1 on detecting relays 0–8 and extends a connection for itself to ground on lead 434. At contacts 8–16, it connects the respective detection chain leads 1–9 over cable group 436 to nine of the ten contacts 5–14 on each of the relays 4R11—4R13 respectively. The detection chain lead 0′ may now also be connected over lead 415, through break contacts 7 on relay 4R9 and over lead 0′ in group 436 to contacts such as 5 on each of relays 4R11—4R13. As in this example no office designation uses the C digit 0, this lead would be in practice jumpered to terminal VAC.

Two of the detecting relays 0–8 operate responsive to the C digit marking in a manner explained to open the original operating circuit for relay 4R8 at their serial contacts 1. However, that relay remains operated, as detecting relay contacts 1 are shunted, as previously explained. The ground from the two-out-of-five check chain indicated by contacts 4 on relays 0–8 is now extended to one of the detecting chain leads 0′–9 corresponding to the registered digit. The detecting chain leads 0′–9 are connected over cable group 436 to contacts 5–14 on the first group of A digit register relays 4R11—4R13. From there they are connected in a manner which will be explained. The check chain ground is also extended past contacts 7 on relay 4R8, and contacts 2 and 6 on relay 4R2 to energize the lower winding of the operated detecting relays 0–8 over their respective contacts 3 and operate the release relay 4R7 respectively. The ground from contacts 6 on relay 4R2 is also extended over contacts 3 on relay 4R4 and over lead 406 in group 499 to operate the office designation storage tank release relay RL1 in the register sender 300A, as will be explained.

In the case of the single-digit office code being registered, ground is extended over lead 405 to operate relay 4R1 instead of lead 404 for operating relay 4R2. Relay 4R1 opens contacts 2 to prevent the completion of a circuit to relay 4R2, and at contacts 1 completes a circuit through the winding of relay 4R3 to resistance battery. At contacts 3, it prepares a circuit to the lower windings of the detecting relays 0–8. At contacts 4, it prepares a circuit to relay 4R7 from the 0 detecting lead, and at contacts 6 extends ground to energize relay 4R10. At contacts 5, it opens the circuit to relay 4R6, which now starts to restore and time the translator function. At contacts 7, a circuit is prepared from lead 435 over lead 412 to relay 4R7 and to lead 406. At contacts 8 and 9, ground is extended to leads 417 and 418, as already discussed, and at contacts 10 ground is extended over lead 414 toward contacts 2 on A digit register relays 4R11—4R13.

Relay 4R3 operates, as before described, to complete a circuit to relay 4R4. Relay 4R4, at contacts 1, completes an aforedescribed circuit to relay 4R5, and at contacts 2 opens a point in the incomplete circuit to relay 4R6, as previously described.

The markings corresponding to the first digit are now extended past the operated contacts 1–5 of relay 4R10 to operate the corresponding ones of the detecting relays 0–8, as already described. It will be noted that relay 4R10 on operating closes contacts 6 to prepare a circuit for 4R7 this time. The detecting relays 0–8 on operating energize their lower windings directly over contacts 2 on relay 4R1 so that they remain operated. They extend the detection chain ground over one of the leads 1, 2, or 3 in group 453 and one of the leads A–123, A–456, or A–789 to both groups of A digit register relays 4R11—4R13 and 4R24—4R27. The operated relay in each of these groups 4R11—4R13 locks operated as previously explained.

In the event detection leads A0 and 0 are grounded, the ground on lead 0 is extended over contacts 4 on relay 4R1, to operate release relay 4R7 instead of one of the relays 4R11—4R13 and 4R25—4R27. Ground on lead A0 is jumper connected over jumper JA0′ to the terminal on translation strip 491 connected to relay TG49. This relay corresponds to a routing to the zero operator, which is provided for with the first office designation digit zero. If one of the relays 4R11—4R13 and 4R25—4R27 is operated, as previously explained, ground is extended to lead 435 in a manner previously explained. It will be noted that relay 4R10 does not release this time as its operating ground is extended from contacts 6 on relay 4R1. The ground on lead 435 is therefore extended past contacts 6 on relay 4R10, over lead 412 and contacts 7 on relay 4R1 to energize relay 4R7, and also extended past contacts 3 on relay 4R4 to lead 406.

Relay 4R7 operates to provide a sequence of operations to be described, while the ground on lead 414 is extended past contacts 2 of the operated relay in group 4R11—4R13 to leads 1, 2, or 3 in cable 439 and past operated contacts 44, 45 or 46 on one of the second group of A digit register relays to one of the terminals 1, 2, 3 on the associated terminal strip. These terminals are cross-connected as will become apparent.

Relay 4R7 operating on completion of either a 3-digit or 1-digit registration, disconnects all the register digit marking leads in cable groups A1, B1, and C1 from cable groups A1′, B1′, and C1′ at contacts 1–15. The operated detecting relays 0–8, however, remain operated over the aforedescribed circuits to their lower windings. Relay 4R7 also closes contacts 17 to extend direct ground to the lower windings of the operated detecting relays 0–8. At contacts 18, it forwards battery over lead 1 in group 419 to operate the relay in group TG1—TG50 or relay VC corresponding to the translation, as will be explained. At contacts 16, it disconnects battery from relay 4R3 and connects the ground through the winding of relay 4R3 to lead 403.

Ground placed on lead 406 at the completion of a 3-digit or 1-digit registration is extended through cable 499 and operated contacts 24 of the translator seizure relay OT1A to lead 340 for operating relay RL1 of FIG. 3, part 3. Relay RL1 operates to open at its contacts 1, 2, and 3 the holding circuits to the operated register relays in any of tanks SRA, SRB, and SRC respectively. These relays restore to permit the translator 400A to return markings for registering digital values, whereby the call is routed to the desired destination. At make contacts 1, 2, and 3 of relay RL1, ground through release-check relay 4R3 in the translator is extended, as soon as release relay 4R7 operates, over lead 403, the make contacts 23 of relay OT1A and lead 329 to the locking contacts of the register relays in tanks SRA, SRB, and SRC. As the register relays are comparatively low resistance even if connected momentarily through their locking contacts to ground through relay 4R3, they will restore.

Relay 4R3 in the translator, therefore, restores to open the circuit to relay 4R4. Relay 4R4 opens the circuit to relay 4R5 at contacts 1, which starts to restore. Relay 4R4 disconnects ground from lead 406 at contacts 3 and connects the ground operating relay 4R7 through contacts 1 of relay 4R5 to lead 2 in cable group 419. Ground restored from lead 406 restores relay RL1 in the register sender to prepare the storage tank relay locking circuits. At contacts 4, relay 4R4 connects leads 4 and 5 in cable group 419 to operate relay VC, if the translation corresponding to a vacant code as will be explained.

If relay 4R3 did not restore, when its operating ground was connected through to lead 403 indicating that the relays in storage tanks SRA, SRB, and SRC did not restore, the circuit to timing relay 4R6 is held open at contacts 2 of relay 4R4. Relay 4R6 would therefore eventually release to provide an alarm.

*Digit translation in office translator 400A*

The detection chain ground corresponding to the C digit in case of a 3-digit registration is extended over one of the leads 0′–9 by the detecting relays 0–8, as described, and over cable group 436 (FIG. 4, parts 2 and 3) to contacts 5–14 on each of relays 4R11—4R12. In this example, assume that relay 4R13 corresponding to A digits 4, 5, and 6 was operated on detection of the A digit, and that detection lead 4 in group 436 was grounded on detection of the C digit. The ground on lead 4 is extended past contacts 9 on relay 4R12 to the corresponding outlet on associated terminal strip 2. The jumpered terminal on strip 2 is connected by jumper J455 to terminal 14 for example on terminal strip 458.

Terminal strip 458 is designed to accommodate, for example, 30 possible jumpers from the ten terminals on each of the strips 1, 2, and 3 associated with relays 4R11—4R13 respectively. In practice, however, as many office designations correspond to vacant codes and are unneeded, many of the thirty available terminals on strips 1, 2, and 3 are jumpered, as shown by jumper J456 from terminal strip 1 associated with relay 4R11 to the vacant code terminal VAC. The jumper J456, therefore, corresponds to the combination of any one of three A digits with one C digit, which do not have a corresponding office code.

The operated B digit register relay 4R19, for example, extends the ground on jumper J455 past its operated contacts 17 to a corresponding one of thirty outlets on the associated terminal strip 2. The ground is extended therefrom over the jumper J475, for example, to terminal 18 of the forty available terminals on terminal strip 454. If the combination of three A digits represented by the operated A register relays, the grounded C digit detection lead and the operated B relay corresponds to an unused or vacant office designation, the corresponding terminal is jumper connected as shown by J465, for example, to terminal VAC. The ground on jumper J475, for example, is extended past the operated contacts of relay 4R27 on the second A digit register group 4R25—4R27, which corresponds to one of three first digits 3, 6, or 9 of the registered office designation. As one of these digits (6, for example) is the same digit as in the group of digits operating relay 4R12, the combination of relays 4R12 and 4R27 provides a translation ground corresponding to the registered A digit 6.

Relay 4R27 extends the ground on jumper J475 past its contacts 22, for example, to thereby provide a selection, which corresponds to the first, second and third digits of the office designation.

This ground on jumper J475 is therefore extended to one of forty terminals on strip 3, associated with relay 4R27 and connected, for example, over jumper J466 to strip 481. This translation represents a route to exchange C, which may be reached over an alternate trunk to exchange D and therefore is extended through contacts of the proper one of the alternate route relays 4R31—4R35. If no alternate routes are available for the particular translation and it is the same for each type of register such as 300A, 260A and 250A, it is jumper connected over jumper J469, for example, to a terminal on strip 491 and a corresponding translation relay TG36, for example. If the particular translation represents different office routes or codes for a local register, EAS register and/or an inter-toll register, the particular terminal is jumper connected over jumper J468, for example, to a corresponding terminal on terminal strip 471. If the translation corresponds to an unused code, it is jumpered, for example, over jumper J465 to the VAC terminal on strip 491.

If ground is extended over jumper J468 to a terminal on strip 471 and, for example, relay 4R28 corresponding to a Tandem Register such as 250A is operated, the ground is extended past the corresponding operated contacts thereon to a corresponding terminal 20, for example, on associated strip 1 and connected over jumper J472 to a translation relay TG22 (not shown) via strip 491. If one of the other register identification relays 4R29 or 4R30 is operated, it likewise may extend ground from jumper J468 to a corresponding jumper such as J478 to another translation relay such as TG21 (not shown). As shown for jumper J489, controlled by relay 4R29, the translation ground may be extended through contacts of one of the alternate route relays 4R31—4R35. Alternatively, as shown for jumper J488, the translation ground may be connected to terminal VAC, if the designation corresponds to a vacant code for the associated Register Sender.

With the route relay 4R31, for example, operated, indicating that the normal route to the office corresponding to the translation is available, the ground on jumper J466 is extended to a corresponding terminal on strip 483 and connected therefrom, as indicated by jumper J484, via strip 491 to the corresponding translation relay TG11 (not shown). If relay 4R31 is restored due to the removal of ground from the corresponding all-trunks-busy lead 1 in group ATB in any well known manner and indicating the normal route is unavailable, jumper J466 is connected via break contacts 1 on relay 4R31 to the corresponding terminal on strip 444 and over jumper J411 to translation relay TG13 (not shown) corresponding to the alternate route.

If a 1-digit office designation such as 1, 3, 5, or 9 is registered, as explained, ground at contacts 10 of relay 4R1 and on lead 414 is extended via contacts 2 on the operated one of relays 4R11—4R13, leads 1, 2, or 3 in cable 439 and through contacts 44, 45 or 46 on the operated relay in group 4R25—4R27 to the corresponding terminal on the associated terminal strip. The ground is then extended over appropriate jumpers such as J495, J496, J497, or J498 to the vacant code terminal VAC or translation relay TG5, such as TG5 (not shown), as required. If the codes are different for respective registers or alternate routes are available, these jumpers are alternatively connected through contacts of relays 4R28, 4R29, and 4R30 and relays 4R31—4R35, if required to provide the necessary services. In case the digit 0 corresponding to the zero operator was registered as a first digit, relay 4R1 is operated, as explained. Ground is extended in this case over jumper JA0' under control of contacts 7 on relay 4R10 to translation relay TG49 (not shown), for example.

In the description of the illustrated trunking plan for office A, various office digits dialed by a subscriber or an operator in exchange A resulted in the storage of respective digits for translation. Given below, therefore, is a chart illustrating the respective operated relays and jumper connections for those digits in the translator for operating the corresponding translation relay:

| Stored Office Digits | A, B, and 0-8 Register Relays | Register Identification and/or Alternate Route Relay | Jumper Connections | Relay TG or VC |
|---|---|---|---|---|
| 754 | 4R13, 4R25, 4R19, 0, 4 | 4R30 | J441, J438, J470 | TG1 |
| 811 | 4R13, 4R26, 4R15, 0, 1 | 4R28 | J448, J449, J468, J472 | TG22 |
| 811 | 4R13, 4R26, 4R15, 0, 1 | 4R30 | J448, J449, J468, J478 | TG21 |
| 654 | 4R12, 4R27, 4R19, 0, 4 | 4R30, 4R31 | J455, J475, J466, J484 | TG11 |
| 654 | 4R12, 4R27, 4R19, 0, 4 | 4R30 | J455, J475, J466, J411 | TG13 |
| 653 | 4R12, 4R27, 4R19, 1, 2 | 4R30, 4R32 | J450, J489, J461, J485 | TG12 |
| 653 | 4R12, 4R27, 4R19, 1, 2 | 4R30 | J450, J489, J461, J431 | TG14 |
| 5 | 4R12, 4R26, 1, 4 | 4R30 | J497 | TG5 |
| 211 | 4R11, 4R26, 4R15, 0, 1 | 4R30 | J422, J423, J452 | TG50 |
| 411 | 4R12, 4R25, 4R15, 0, 1 | 4R30 | J462, J463, J469 | TG36 |
| 0 | 2, 8 | 4R30 | JAO' | TG49 |
| xxx Vacant Code | other combination | 4R30 | J416, J479, etc. | VC |

The vacant code translation is provided for those cases of an office digit being dialed, which is not used. The jumpering is arranged accordingly and for clarification are mostly shown brought to terminal block 429' (FIG. 4, part 4) and then extended to vacant code terminal VAC over lead VAC.

The ground extended to the TG relays over any of the jumpers, as explained, is extended through the winding of the corresponding one of translation relays TG1—TG50 to battery on lead 1 in cable group 419 to operate that translation relay. Only a few examples of the TG relays are shown, for the purpose of illustrating the operation thereof. In the case of ground being extended to terminal VAC, it is extended over lead 5 in cable group 419, past restored contacts 4 on relay 4R4, and back over lead 4 in group 419 to operate relay VC from the battery on lead 1. Relay VC locks operated to ground on lead 418. It will be recalled that ground could have been extended to terminal VAC and lead 5 in group 419, with relay 4R4 still operated, and relay 4R7 restored. The ground on lead 5 is then extended past make contacts 3 and 4 on relay 4R4 to operate relay 4R7 and to lead 406 for operating relay RL1 to provide aforedescribed operations.

With relay 4R4 restored, as explained, and relay 4R5 still operated, the operating ground for relay 4R7 is extended past contacts 3 on relay 4R4 and operated make contacts 1 on relay 4R5 to lead 2 in cable group 419. This ground is extended past the operated make contacts of the operated TG relay or relay VC, if operated, to mark the leads to the register as follows:

| Operated Translation Relay | Leads Grounded | | | Control Group |
|---|---|---|---|---|
| | A Group | B Group | C Group | |
| TG1 | 2, 8 | 0, 1, 2, 4 | 0, 1, 2, 4 | LOC. |
| TG5 | 0, 4 | 0, 1, 2, 4 | 0, 1, 2, 4 | DS, OTG. |
| TG11 | 0, 2 | 0, 2 | 0, 1, 2, 4 | DS, OTG. |
| TG12 | 1, 2 | 1, 2 | 0, 1, 2, 4 | DS, OTG. |
| TG13 | 1, 2 | 1, 4 | 0, 1, 2, 4 | DS, OTG. |
| TG14 | 0, 2 | 0, 1 | 0, 1, 2, 4 | DS, OTG. |
| TG21 | 1, 4 | 1, 4 | 0, 1, 2, 4 | ES, OTG. |
| TG22 | 0, 1 | 1, 4 | 1, 2 | DS, ES, OTG. |
| TG36 | 1, 4 | 0, 4 | 0, 1, 2, 4 | ES, OTG. |
| TG49 | 1, 4 | 1, 4 | 0, 1, 2, 4 | ES, OTG. |
| TG50 | 1, 4 | 1, 2 | 0, 1, 2, 4 | ES, OTG. |
| VC | 1, 4 | 0, 2 | 0, 1, 2, 4 | ES, OTG. |

Leads LOC and OTG are actually not marked by the translation relays until relay 4R5 restores to place ground on lead 3 in group 419 at its contact 1. It will also be noted that the leads 0, 1, 2, and 4 if marked in any group correspond to the digit 12. The storage tank in which the digit 12 is therefore stored is not used to transmit routing information, and serves only to control the register sender to skip the tank in which it is stored. If desired, of course, such as in the case of more than ten-level switches, digits 11–15 may be transmitted from the translator and stored in the register sender for out-marking or transmission.

The markings on the various leads are transmitted over cable group 402. The A, B, and C digit marking leads 0–8 are connected over cable 402 and through groups A1, B1, and C1 respectively, over cable group 499 and the respective contacts of the translator seizure relay OT1A to transmit the ground markings to opreate corresponding storage relays in tanks SRA, SRB, and SRC. The operated storage relays now lock over already described circuits. Ground marking on either or both control leads DS and ES are likewise transmitted over cable group 402 and 408 to cable group 499 and the operated contacts of relay OT1A to operate either or both relays 3R28 and 3R30, as required.

Slow-to-release relay 4R5 on restoring connects the operating ground for relay 4R7 through its contacts 1 to lead 3 in group 419. Lead 3 is connected through the make contacts of the operated TG or VC relay to mark lead LOC, if the call is from a local subscriber in office A to another office A subscriber. Other types of calls using register sender 300A result in the ground marking being extended by the operated translation relay to lead OTG. The ground of either of leads OTG or LOC is extended over cable groups 402, 408, and 499, through the contacts of the translator seizure relay OT1A to operate either relay 3R26 or 3R27 (FIG. 3, part 6), depending on which lead is marked. Relay 3R26 or 3R27 on operating releases relay OT1A at respective contacts 3 or 5. Relay OT1A on restoring disconnects the register sender 300A from the translator 400A. Relays 4R1 or 4R2 and the register identification relay, such as 4R30, therefore restore.

With relay 4R1 restored, the ground for holding relay 4R7 operated is restored at contacts 4 or 7. With relay 4R2 restored, ground for holding relay 4R7 operated, is restored at contacts 2 and 6. Relay 4R7, therefore, restores. In addition, ground is removed from leads 417 and 418 to restore the operated ones of relays 4R11—4R13, 4R15—4R24, 4R25—4R27 and/or relay VC. With relay 4R1 restored, ground for holding relay 4R10 operated is restored, while with relays 4R11—4R13, 4R15—4R24, and 4R25—4R27 restored, ground for holding any of relays 4R10, 4R9 or 4R8 operated, is restored. Depending on which is operated, relays 4R8, 4R9 or 4R10, therefore, restore.

Relay 4R7 restores any operated detecting relays 0–8 at contacts 17. At contacts 18, it removes the battery for the translation relays TG1—TG50 and relay VC. The original operating circuit for relay 4R6 is now recompleted before it restores. With relays 4R1 or 4R2, relay 4R7, the identification relays 4R28—4R30, the translator register relays 4R11—4R13, 4R15—4R24, and 4R25—4R27, and any operated one of translation relays TG1—TG50 or relay VC restored, the office translator 400A is now available for use with another register sender.

*Register sender digit transmission*

Relays 3R26 or 3R27 (FIG. 3, part 6), on operating, each lock to ground on lead 301 over their respective locking contacts 2 and 4. As before stated, relay 3R26 is operated on a call to a subscriber in office A. It prepares a circuit to the number group translator seizure relay TS by connecting leads 309 and 305 at its contacts 1. On this type of call the forward switch train is controlled until the subscriber digits following the office designation are received and translated by the number group translator. The register sender 300A, therefore, waits until the sequence switch ISS, which is being stepped, as before described responsive to dialled digits, steps to its seventh contact. The last subscriber digit is stored in tank SRU (part 4), when switch ISS is on its seventh contact in a manner already described. Now when relay 3R7 restores (part 1), ground from contacts 4 of relay 3R6 is also extended past the seventh contact of switch ISS level B, contacts 4 on relay 3R7 to lead 303, contacts 4 on relay 3R10, lead 305, contacts 1 on relay 3R26 and lead 309 to battery through the chain circuit of seizure relay TS. Relay TS will not be operated on other types of calls, as relay 3R27 is operated in that case instead of relay 3R26.

Relay TS connects the 0–8 marking leads of tanks SRC, SRTH, SRH, SRT and SRU to the appropriate number group translator over leads 1–25 through access switch AS3 (FIG. 1) for example. The local number translation is then performed, as explained in the aforementioned application. The number group translator causes 5-digits corresponding to the subscriber number to be registered in tanks SRC—SRU. The skip digit registered in tank SRC by the office translator 400A is erased on this type of call, and the tank SRC is used by the number group translator to register a digit. This is necessary because 4-digits and a ring-digit totaling 5-digits are needed to control the switch train in order to complete the local call. When the number group translator has completed its function, ground is returned on lead OK (part 4), over lead ST in group 308 and lead 310 to operate outmarking relay 3R10. If a lock in condition occurs the number group translator returns ground on lead BU in group 308 and over lead 304 to energize the upper winding of busy relay 3R2 for a purpose explained in the aforementioned application.

If the call is other than to a local subscriber, relay 3R27 is operated. In this case outmarking from the register sender 300A begins immediately. At contacts 3, relay 3R27 extends ground from hold lead 301 to lead 310 for operating outmarking relay 3R10. In the meantime incoming digits, if any, are registered in respective storage tanks as described.

Out-marking relay 3R10 locks to ground on lead 301 through its contacts 3. At contacts 1, it extends ground over lead 307 to the wiper A of switch OSS, and through contacts 1 of relay 3R11 for energizing the stepping magnet of the out-marking sequence switch OSS. At contacts 2, it extends ground through contacts 1 of relay 3R13 to energize slow-to-release relay 3R12. At contacts 4 of 3R10, lead 303 is disconnected from lead 305 to free the number translator. At make contacts 5, 3R10 extends ground over lead S in the group marked Out for initiating operation of the first-selector controller and for operating relay 3R8, which connects lead S in the group marked In to lead S in the group marked Out.

Relay 3R12 on energizing closes a circuit, at contacts 1, to slow-to-release relay 3R11. At contacts 2 and 3, relay 3R12 disconnects the outgoing trunk conductors from the plus and minus outmarking contacts on outmarking relays S0–S8. Relay 3R11 connects the outgoing trunk conductor T to relays 3R14 and 3R15 at its contacts 3 and 4; and at contacts 1 removes the energizing ground for the stepping magnet of switch OSS.

In the meantime, switch OSS steps to its first contact. It extends ground on its level A wiper over lead 1 in cable group 319 to energize the first outgoing sequence relay OS1. Relay OS1, at contacts 1–5, connects the ground marking of the operated relays in the A digit storage tank SRA through the operated locking contacts to leads 0–8 in group 318. The ground markings are extended to operate corresponding ones of out-marking relays S0–S8.

Relays S0–S8 complete a two out of five check chain indicated by respective contacts 1 to operate relay 3R16 from ground at contacts 2 of relay 3R11. The S0–S8 relays close respective contacts 2 to complete the connection of Out conductor R over busy conductor 304 to busy relay 3R2. They also extend a detection chain ground over conductor 330 to mark level A of decimal sender switch SS (part 5) with the decimal value of the digit registered for no purpose at the present time.

If the previously noted associated selector switch controller is not available for control, ground is returned over Out back contact R, 3 on relay 3R9, contacts 4 on relay 3R11, contacts 4 on relay 3R13, contacts 2 of relays S0–S8, and lead 304, to operate busy relay 3R2. Relay 3R2 in this event extends ground to the upper winding of the cut-off relay 3R1, which extends its operating ground to lead BY, and disconnects relay 3R3 from the incoming loop. Busy tone is then returned to the calling party, and the register sender is restored.

If the noted first-selector switch controller is available, it closes a controller-ready high-resistance circuit path (not shown) for operating controller pilot relay 3R14 over tip conductor T of the Out group. Controller-ready relay 3R13 is thereby operated. Relay 3R13 locks operated, at contacts 2, through contacts of storage-pilot relay 3R16, operated by relays S0 to S8 at their contacts 1. At contacts 4, controller-ready relay 3R13 disconnects busy relay 3R2 from R of Out; at contacts 3, it disconnects relays 3R14 and 3R15 from T of Out; and at its contacts 2, it prepares a self-locking path controlled by storage-pilot relay 3R16.

With relay 3R13 now operated and locked as described, relays 3R12 and 3R11 now restore in succession. In the interval between the restoration of 3R12 and the restoration of 3R11, positive and negative pulses from transformer TR, over conductors 1181, are sent over T and R of Out as plus and minus digit-marking signals for the controller, the digit value being according to the setting of digit-storage relays S1–S8, now connected by OS1 to register SRA.

On restoring as described, relay 3R11, at its contacts 2, restores storage-pilot relay 3R16, whereupon relay 3R13 restores to cause relays 3R12 and 3R11 to reoperate in succession.

During the short interval of its restoration, relay 3R11, at its contacts 1, reoperates Step of OSS, advancing OSS to its second position to restore sequence relay OS1 and to operate sequence relay OS2.

Digit storage relays S1 to S8 now clear out and reoperate according to the digit stored in register SRB.

Relays 3R16, CL, 3R12, and 3R13 may thus again respond as described, this time to transmit the second-digit signals. The operations proceed as described until digit signals are transmitted corresponding to the remaining stored digits.

If the call is being extended within exchange A, the digit stored in tank SRA is either 5 or 0 and the associated selector switch such as LFS1—LFSX is positioned by the outmarking of this digit accordingly. The connection is then extended to either the thousands selector THS or to the second selector switch SS, in accordance with the outmarked digit. If the call is proceeding to called subscriber 201, the remaining stored digits with the exception of the skip digit stored in tank SRB must be plus and minus outmarked to control the respective switches THS, HS and CS. The skip digit stored in tank SRC from the office translator 400A was erased by the number translator T0–T9 and a digit stored therein for controlling the selector THS on this type of call. If the call is proceeding to one of the operator positions such as 203 or in the event a vacant code was dialled to the recording announcer RA, the selector switch SS must be controlled to its second, third, fourth, or fifth level accordingly. In the latter case, the digit stored in the tank SRB by the office translator 400A is also plus and minus out-marked to control the position of switch SS and thereafter out-marking is terminated.

Relays S0–S8 are, therefore, operated in accordance with the stored digit in the storage tank SRB. Relay 3R14 is connected to conductor T, as before. If the call is to an operator position 203 or RA, the digit is to be plus and minus out-marked and sufficient time is provided for operation of relay 3R14. It operates, as before described, to operate relay 3R13, and the described plus or minus out-marking process is repeated to position the switch SS on one of the four levels extending to respective operator positions or RA. Further out-marking is then terminated, as will be explained. If the call is to subscriber 201, the trunk is extended in response to the first digit to switch THS. The digit stored in tank SRB is the skip digit 12 for which relays 0, 1, 2 and 4 are operated responsive to corresponding marking returned by the translator. As shown between terminals 1 and 2 of tank SRA, operation of relays 0, 1, 2 and 4 completes a connection between the terminals. In the same manner, if tanks SRB or SRC have a skip digit stored therein, a connection between respective terminals 1 and 2 is completed.

With a skip digit registered in tank SRB as on a call to subscriber 201, the ground at contacts 6 of relay 3R10 is extended over lead 317, terminals 1 and 2 of tank SRB, lead 324, contact 2 of level B of switch OSS to self-interruptedly step switch OSS to contact 3, before relay 3R14 can operate. Accordingly, sequence relay OS3 is operated instead of relay OS2.

When switch OSS steps from contacts 2, relay OS2 is restored to restore relays S0–S8. With the call proceeding to subscriber 201 the number group translator has stored one of digits 0–9 in tank SRC. Relay OS3 is now operated by ground on lead 3 in cable group 319 to cause the digit marking in tank SRC to operate relays S0–S8 accordingly. This digit is therefore, plus and minus out-marked as explained for tanks SRA or SRB to control the thousands selector THS accordingly.

In this manner, each of the other sequence relays OS4—OS7 are operated and stored digits in storage tanks SRTH—SRU are plus and minus out-marked in sequence, if the call is proceeding to a called local subscriber such as 201. The hundreds selector HS, and connector switch CS are controlled by the respective digits stored in tanks SRTH—SRU. The digits stored in tanks SRH, SRT, and SRU, being the tens, units, and ring digits of the called subscriber's number, as explained in the aforementioned application, are transmitted to the connector switch. In the example shown for a call to subscriber 201 the number group translator has stored the digits 6, 5, 9, 7, 1 in tanks SRC—SRU respectively. Accordingly, switch THS is stepped to its sixth level, switch HS to its fifth level and the connector switch to its ninth level to extend the connection.

In position 8, switch OSS energizes relay S0 by extending ground over its level A wiper and rectifier 376. Relay S0 in turn energizes relay 3R16 and connects the conductor R to busy relay 3R2 at its contacts 2. If the called line is idle, relay 3R2 does not operate, but 3R15 operates, responsive to a marking returned over conductor T. It closes contacts 1 to operate relay 3R1 over lead 302 to release the register, as will be explained.

If the connection is extended to selector switch SS, the digit stored in tank SRB is not a skip digit and is plus and minus out-marked, as explained to position the selector switch accordingly. In the case of calls proceeding to the information operator, long distance operator, zero operator, or the recording announcer RA, the digits 3, 4, 5 and 2 respectively are marked in tank SRB. The second selector switch SS is positioned on the corresponding level by the plus and minus out-marking under control of relays S0–S8.

Switch OSS is then stepped to its third contact, as explained, to operate relay OS3. Relay OS3 connects the markings in the tank SRC to relays S0–S8 to operate these relays in accordance with the skip digit 12 stored therein on these types of calls.

In this case, the skip digit 12 marked in the tank SRC causes ground to be extended from contacts 6 of relay 3R10, lead 317, terminals 1 and 2 connected through contacts of relays 0, 1, 2 and 4 in tank SRC, lead 325 and over the third contact and of level B of switch OSS to energize the stepping magnet of OSS in a manner similar to that explained for a skip digit registered in tank SRB. The switch OSS, therefore, steps to the fourth position before relay 3R14 can operate. Ground on lead 307 is extended over the fourth contact of level A of switch OSS, lead 322 and past operated contacts 1 of relays 3R30 and 3R27 respectively to lead 302 for energizing the lower winding of the cut-through relay 3R1. In the meantime ground on lead 4 in group 319 operates relay OS4, however, no effect is had on the register sender function now.

Relay 3R1 disconnects the incoming trunk conductors T and R to release the line relay 3R3, and locks to ground on the lead BY. In addition, it extends ground from the contacts of relay 3R2 over the CT lead so that the cut-through relay in the forward loop connects the incoming and outgoing trunk conductors T and R respectively, and the calling subscriber is now cut through to the recording announcement position or one of the operator positions over respective trunks 204, 205, 206, or 207 extending from the second selector switch SS.

It will be noted that in the case of calls to offices C, D, or E, that after the plus and minus out-marking to position the first selector LFSX etc. on one of the first four levels, decimal out-pulsing must occur. An operator extending a call to exchange B over trunk 208 and the operator's selector switch OFS is using register sender 250A, for example. The first digit 1 is plus and minus out-marked from that sender, as explained for sender 300A, to position switch OFS accordingly and thereafter the remaining digits are decimally out-marked as explained below. In case decimal out-marking is required, relay 3R28 has been operated by ground on lead DS from the translator 400A. It has locked operated to lead 301 and prepared a circuit to relay 3R29. When switch OSS is stepped from its first to its second contacts, ground is extended over lead 323, past the operated contacts of relay 3R27 and contacts 1 on relay 3R28 to energize relay 3R29. In addition, relay OS2 is operated as explained to connect the markings in tank SRB to relay S0–S8. Relays S0–S8 are therefore operated in accordance with the digit stored in tank SRB.

Relay 3R29 at contacts 2 extends ground over lead 316 to energize relay 3R9 and over contacts 3 on relay 3R22 to the pulsing relay 3R20. Relay 3R29 also locks operated to ground on lead 301 at its contacts 1. Relay 3R9 locks to ground on lead 301 over its contacts 1, and disconnects the outgoing trunk conductors T and R at its contacts 2 and 3 respectively from contacts of relay 3R11. Instead, relay 3R9 connects outgoing conductors T and R to the decimal sender via conductors 381 and 382, which are connected together at contacts 1 on relays 3R20 and 3R21 and at contacts 2 on 3R24 to complete a loop circuit to a pulse or line relay in the forward loop.

The decimal sender is equipped with a pulse source placing battery at 10PPS through the winding of relay 3R20. With ground extended on lead 316 towards relay 3R20, relay 3R20 operates at the rate of 10PPS. It opens a point between conductors T and R at contacts 1, and energizes the stepping magnet of switch DSS. When the battery is removed from relay 3R20, it restores to enable the stepping magnet of switch SS to step its wipers. The stepping magnet steps its wipers on deenergization to its first contact. On its first contact, switch DSS extends ground from level B to energize slow-to-release pickup relay 3R21.

Relay 3R21 opens another point between conductors T and R at its contacts 1, and prepares a circuit to slow-to-release stop relay 3R22. As the brushes of DSS are advanced over their contacts for the first time, no pulses are sent over the loop because of the loop shunt at contacts 2 of 3R24.

When the upper brush of DSS encounters the ground-marked one of the ten conductors 1 to 10 of group 330, stop relay 3R22 operates. Relay 3R22 shorts the loop over conductors T and R at its contacts 2; locks to ground over to contacts 4, opens the pulsing circuit to relay 3R20 at contacts 3, and energizes counting relay 3R23 over its contacts 5, through contacts 4 on relay 3R24. At its contacts 6 relay 3R22 completes a self-interrupted homing circuit for the switch DDS from the multiplied contacts of level B.

Contacts 1 of counting relay 3R23 close a circuit for counting relay 4R24, which does not operate for the time being. When switch DSS is stepped home however, ground is removed from relay 3R21 and it starts to restore to in turn start the restoration of relay 3R22. When relay 3R22 restores, it opens contacts 5 to cause relay 3R24 to operate in series with relay 3R23 from ground on lead 316.

Relay 3R24 removes ground at contacts 3 from level A of switch DSS to enable relay 3R22 to energize from any detection chain ground extended over cable 330 to one of the level A contacts by relays S0–S8. Relay 3R24 prepares a pulsing circuit by disconnecting conductors T and R at its contacts 2 so that only contacts 1 of pulse relay 3R20 and 3R21 now complete the loop thereover.

In the meantime, if a skip digit had been registered in tank SRB as on calls to office E, ground on lead 317 is extended over lead 391, as before described to self-interruptedly step switch OSS. Relay OS3 is therefore operated to connect the markings from tank SRC to relays S0–S8. Relays S0–S8 are therefore operated accordingly to extend a corresponding detection chain ground over the digit leads in cable group 330 to mark the corresponding bank contact of level A of switch DSS. Switch OSS steps to operate relay OS4 and relays S0–S8 are therefore marked in accordance with a subscriber digit stored in tank SRTH. On calls to office B, C or D, tank SRB is normally marked and switch OSS waits until switch DSS is prepared to send the corresponding digit.

The digit stored in the tank with which switch OSS is not associated will now be transmitted. With relay 3R22 restored, a pulse applied to relay 3R20, energizes it to pulse the stepping magnet of switch DSS. Switch DSS steps to contacts 1 to energize relay 3R21. The loop over conductors T and R is now under control of relay 3R20. It pulses the loop for stepping the switch controlled thereby at the next office and simultaneously pulses sending switch DSS. Relay 3R22 does not now operate from contacts 3 on relay 3R24, as relay 3R24 is operated. The level A contacts of switch DSS are marked by a detecting chain ground extended by the out-marking relays S0–S8.

The stepping magnet steps in response to pulses applied to relay 3R20, while relay 3R20 pulses the loop to control the switch train over conductors T and R, until the wiper of level A encounters the detecting chain ground extended over cable 330. The detecting chain ground is extended over the wiper of the level A and energizes the slow-to-release stop relay 3R22. Relay 3R22 at contacts 3 opens the circuit to relay 3R20 to prevent further pulsing, and holds the loop complete at contacts 2. It locks up to contacts 2 of relay 3R21. At contacts 6 it completes a self-interrupting stepping circuit for switch DSS from ground on its level B wiper. Switch DSS on stepping from the grounded detecting chain lead opens the original circuit to relay 3R22, however, it remains operated over its locking circuit. At contacts 1 relay 3R22 completes a circuit from contacts 1 on relay 3R24 over lead 391 for stepping switch OSS to the succeeding position.

When switch DSS steps home, the ground for holding relay 3R21 operated is removed, and it restores to open the circuit to relay 3R22; which restores. Relay 3R22 permits the pulse circuit to relay 3R20 to be completed. With switch OSS stepped, as described, a digit stored in the succeeding tank will now be decimally out-pulsed, if required, under control of relays S0–S8.

If only one office digit is to be decimally out-marked as in the case of calls through exchanges C or D, tank SRC has been marked with a skip digit so that switch OSS is again stepped over leads 317 and 325 to operate relay OS4, before switch DSS steps past contact 1. This causes the first subscriber digit stored in tank SRTH to be marked in relay group S0–S8. Switch DSS steps to contact 1 to operate relay 3R21 and the digit stored in tank SRTH is decimally out-pulsed, as explained. Similarly, the remaining subscriber digits stored in tanks SRH, SRT and SRU are decimally out-pulsed in succession, as switch OSS is thereafter stepped in succession over lead 391 by relays 3R22 and 3R24. If only the subscriber digits are to be decimally out-marked, as on a call to exchange E, tanks SRB and SRC are each marked with a skip digit so that switch OSS advances to operate relay OS4, before decimal out-pulsing occurs, as explained. Thereafter, the remaining subscriber digits are decimally out-pulsed in succession under control of tanks SRTH—SRU.

If the call is proceeding through office B, tank SRC is marked with the digit 3. In this case the digit in tank SRC is decimally out-pulsed as explained. In the case of calls to or through office B, subscriber digits are not provided, and when switch OSS steps to contacts 4 following the transmission of the digit in tank SRC, it operates relay OS4 and also extends ground over lead 322, through contacts 1 on relay 3R27 and contacts 1 on relay 3R30 to lead 302 for operating the cut-off relay 3R1.

After the last subscriber digit is decimally out-pulsed switch OSS is stepped to contact 8, in an explained manner. Switch OSS then extends ground over level A contacts 8 to lead 355. This ground is extended through contacts 1 on relay 3R27 to lead 382 to operate relay 3R1.

Relay 3R1 disconnects the incoming conductors T and R from relay 3R3 to restore it. Relay 3R1 connects ground from contacts 1 of relay 3R2 to lead CT to signal the forward switch train so that the trunk conductors are cut through. Relay 3R3 restores to open the circuit to relay 3R4. Relay 3R4 restores relay 3R5, which removes ground from lead 301.

At contacts 3 relay 3R5 completes the circuit to release magnet of switch OSS to send it home and all out sending relays OS1–OS7 are restored. Relay 3R3 restores, before relay 3R5, to energize relay 3R6 and relay 3R7 in turn. Relay 3R5 then restores relay 3R6, which homes switch ISS on restoration of relay 3R7 thereafter. Switch ISS homes from ground at contacts 3 of relay 3R5. Ground is removed from lead HI and 301, by relay 3R5 to release the access switch and restore relays 3R9, 3R10, 3R26, 3R27, 3R28, 3R29, 3R30, 3R31 and 3R32, if operated, and any operated storage tank relays. Relay 3R8 restores when ground is removed from leads S and relays 3R11 and 3R12 are restored by relay 3R10. With relay 3R29 restored, ground is removed from lead 316 and relays 3R23, 3R24 and 3R20 are restored, while switch DSS remains in its home position.

While I have described above the principles of my invention in connection with specific apparatus, it is to be clearly understood that this description is made only by way of example and not as a limitation to the scope of the invention.

What is claimed is:

1. A translator for use in a switching system wherein a plurality of office designation digit sequences each correspond to respective different destinations and another plurality of office designation digit sequences each correspond to the same destination and wherein means are provided for storing a digit or digits in any one sequence in one of a plurality of classes of register senders each having access to said translator, the improvement comprising means in said translator for decoding one digit in a sequence to provide a single marking representing a number of different digits, means for combining said single marking with a marking corresponding to another digit for representing a corresponding combination of digits, a vacant code means, a translating means, and means for marking said vacant code means to provide a corresponding translation to said register sender in response to said corresponding combination representing said same destination and for marking said translating means in accordance with said one digit and a plurality of additional digit markings in response to said sequence of digits representing one of respective destinations.

2. A translator for use in a switching system wherein a plurality of office designation digit sequences each correspond to respective different destinations and another plurality of office designation digit sequences each correspond to a vacant office designation and wherein means are provided for storing a digit or digits in any one sequence in a series of registers having access to said translator for translation of each of said sequences into respective routes, first means operated responsive to a digit stored in one of said registers for extending a pair of decimal markings each corresponding to a plurality of different combinations of decimal digits, each combination including said digit, a pair of relays each operated by a respective one of said pair of markings, said first means thereafter extending another marking individual to a digit stored in another one of said registers, a circuit corresponding to one of said combinations of digits and said other registered digit thereafter extended by one of said pair of relays whereby a combined marking is provided corresponding to one plurality of different digit combinations, a vacant code relay operated by said extended circuit in response to its correspondence with any digit sequence corresponding to said vacant office, said first means also operated responsive to a digit stored in a second other register for controlling said extended circuit in response to its correspondence to one of said respective destinations to provide a last marking corresponding to said plurality of digit combinations and said digit stored in said second other register for operating said vacant code relay in response to said last marking corresponding with said vacant office destination, and a last circuit for extending said last marking through contacts of the other of said pair of relays in response to said last marking corresponding to any of said respective destinations whereby a marking is derived individual to the digit sequence stored in said one register.

3. An arrangement such as claimed in claim 2 in which said series of registers are of one class, a plurality of registers of another class having access to said translator, and means for identifying each class to control said marking individual to the digit sequence in accordance with the register class.

4. A translator for use in a telephone system wherein a plurality of office designation digit sequences each correspond to different destinations and another plurality of digit sequences correspond to one destination and wherein means are provided for storing any one of said sequences in a register having access to said translator for translating each of said sequences into respective routes to said destinations, the improvement comprising first means operated responsive to one first digit stored in said register for extending a marking corresponding to a plurality of different decimal digits including said one digit, a relay operated by said marking, said means thereafter operated responsive to another digit stored in said register for extending another marking individually corresponding to said other digit, a circuit having said other digit marking thereon and corresponding to said plurality of different digits thereafter extending by said operated relay whereby a combined marking is provided corresponding to a plurality of different digit combinations, and a vacant code relay operated by said combined marking responsive to its correspondence with said one destination.

5. An arrangement such as claimed in claim 4, in which said first means is operated responsive to said one digit for extending a marking corresponding to another plurality of decimal digits including said one digit and is operated responsive to an additional digit stored in said register for extending a marking individual to said additional digit, a relay individually corresponding to said other plurality of digits and operated by the corresponding marking, another relay individually corresponding to said additional digit and operated by the marking individual to said additional digit, means for extending said combined marking through the contacts of said other operated relay and through the contacts of said operated other plural digit relay in the event said combined marking including said one digit and said additional digit correspond to one of said different destinations, and a relay individual to said one different destination operated by said extended combined marking.

6. An arrangement such as claimed in claim 4, in which said first means is operated responsive to a different additional digit for extending a marking individual thereto to said vacant code relay in the event said different additional digit is only used in an office digit sequence corresponding to said one destination.

7. An arrangement such as claimed in claim 4, in which said first means extends respective other plural digit markings in response to the storage of another first digit in said register, a pair of relays each operated by respective ones of said other plural digit marking and each corresponding to said other first digit, and a circuit for extending said other digit marking through the contacts of said operated pair of relays and through the contacts of said additional digit relay in response to its operation for operating said vacant code relay in the event the digit sequence corresponds to said one destination.

8. In an office translator for use with a register sender the improvement comprising a group of detecting relays, a plurality of groups of storage relays, means for controlling said detecting relays responsive to a succession of office digits stored in said register sender to store a one digit in a respective group of said storage relays, means for controlling said detecting relays for extending a marking individual to another digit stored in said register sender through contacts of said one group of relays, a translation relay for each proper office route, a vacant code relay common to each unused office route, jumpers for extending only those markings to the contacts of another of said groups of relays for operating a corresponding translation relay in response to the marking corresponding to a proper office route, and jumpers for extending the other markings from the contacts of said one group to said vacant code relay.

9. An arrangement as claimed in claim 8, in which one of said groups of storage relays comprises a plurality of sub groups having relays each corresponding to a plurality of different digits.

10. An arrangement such as claimed in claim 9, in which one relay in each of said sub groups corresponds to the same digit whereby the storage of said digit causes said one relay in each sub group to control a circuit individual to said digit.

11. In an arrangement such as claimed in claim 8, means in said register sender for transmitting digits in a plurality of codes, and means controlled by said translation relay for controlling said means to transmit a digit in one of said codes followed by the transmission of a digit in another of said codes, and means controlled by said vacant code relay of controlling said transmitting means to transmit a digit in said other code.

12. A translator comprising a means controlled for decoding a series of digits into a marking individual to each digit, a pair of relay groups having a relay in each group operated responsive to one decimal marking and in which groups each relay in each group individually corresponds to a different combination of decimal digits and wherein each relay in one group corresponds to all relays in the other group, another group of relays, one of which is operated by another decimal marking and each of which individually corresponds to a different decimal digit, and a marking circuit extended by the operated relay in one of said pair of groups in response to a last decimal marking through contacts of the said operated relay in said other group and through contacts of said operated relay in the other of said pair of groups to provide a translation corresponding to the digits.

13. An arrangement such as claimed in claim 12, in which said means comprises an arrangement for decoding a digit marked in accordance with a two-out-of-five code into a decimal marking.

14. In an arrangement such as claimed in claim 12, means for identifying the number of digits in a series, and a circuit extended only through the contacts of an operated relay in each of said pair of groups to provide a translation corresponding thereto in response to said means identifying the presence of only one digit in a series.

15. A register sender having a series of registers for storing successive digits, a translator, means for transmitting certain of said digits from said series of registers to said translator for translation, means for thereafter erasing said certain digits from the respective registers and for storing other translated digits corresponding to said transmitted digits in said register sender under control of said translator, means for transmitting any one of said other digits as an individually corresponding number of serial pulses, means for transmitting said other stored digits in a code marking, and means controlled by said translator responsive to the certain digits transmitted thereto for serially controlling both said transmitting means to transmit a different one of said stored other digits in response to one translation of said certain digits; to control only one of said transmitting means to transmit one stored other digit responsive to translation of another series of stored successive digits and to control both said means individually for transmitting an alternate one of any stored other digits responsive to the translation of a third series of stored successive digits.

16. An arrangement such as claimed in claim 15, in which each of said transmitting means is controlled for transmitting a number of stored other digits dependent on the translation.

References Cited in the file of this patent

UNITED STATES PATENTS

| | | |
|---|---|---|
| 2,559,312 | Newsom | July 3, 1951 |
| 2,686,838 | Dehn | Aug. 17, 1954 |
| 2,866,003 | Walsh | Dec. 23, 1958 |